United States Patent
Ding et al.

(10) Patent No.: US 10,074,907 B2
(45) Date of Patent: Sep. 11, 2018

(54) APPARATUS AND METHOD FOR MITIGATING MULTIPATH EFFECTS AND IMPROVING ABSORPTION OF AN AUTOMOTIVE RADAR MODULE

(71) Applicant: Veoneer US, Inc., Southfield, MI (US)

(72) Inventors: Xueru Ding, Newton, MA (US); Paula Arinello, Lowell, MA (US); Jonathan Williams, Andover, MA (US); Richard Leung, Westford, MA (US); Bernard DeMersseman, Andover, MA (US); Arnaud Amadjikpe, Chelmsford, MA (US)

(73) Assignee: Veoneer US, Inc., Southfield, MI (US)

( * ) Notice: Subject to any disclaimer, the term of this patent is extended or adjusted under 35 U.S.C. 154(b) by 138 days.

(21) Appl. No.: 14/645,958

(22) Filed: Mar. 12, 2015

(65) Prior Publication Data
US 2016/0268693 A1 Sep. 15, 2016

(51) Int. Cl.
*G01S 13/93* (2006.01)
*H01Q 17/00* (2006.01)
(Continued)

(52) U.S. Cl.
CPC ............ *H01Q 17/008* (2013.01); *G01S 7/03* (2013.01); *G01S 7/032* (2013.01); *G01S 13/931* (2013.01);
(Continued)

(58) Field of Classification Search
CPC ................. H01Q 17/008; G01S 7/03
(Continued)

(56) References Cited

U.S. PATENT DOCUMENTS

| 5,525,988 A | 6/1996 | Perkins et al. |
| 5,962,148 A | 10/1999 | Nishimura et al. |

(Continued)

FOREIGN PATENT DOCUMENTS

| DE | 10252446 | 5/2004 |
| DE | 102011052363 | 2/2013 |

(Continued)

OTHER PUBLICATIONS

Search Report and Written Opinion dated Jun. 15, 2016 in corresponding PCT Application No. PCT/US2016/021371, filed Mar. 8, 2016.

*Primary Examiner* — Marcus E Windrich
(74) *Attorney, Agent, or Firm* — Burns & Levinson, LLP; Steven M. Mills

(57) ABSTRACT

A radar system and method with reduced multipath effects include a first component of a radar sensor module on which at least one antenna element is formed, the at least one antenna element having a surface at which radar radiation is received or transmitted, the at least one antenna element having a radiation aperture. A second component in proximity to the antenna element such that a portion of the radar radiation impinges on the second component comprises an angled surface forming an angle with the surface of the antenna element. The angled surface of the second component comprises a texture such that when the portion of the radiation impinges on the angled surface, the amount of multipath signal propagating through the radiation aperture of the antenna element is reduced.

26 Claims, 19 Drawing Sheets

(51) Int. Cl.

| | | |
|---|---|---|
| *G01S 7/03* | (2006.01) | |
| *H01Q 1/32* | (2006.01) | |
| *H01Q 1/42* | (2006.01) | |
| *H01Q 1/52* | (2006.01) | |
| *H01Q 13/20* | (2006.01) | |
| *H01Q 21/00* | (2006.01) | |
| *H01Q 21/06* | (2006.01) | |
| *G01S 7/02* | (2006.01) | |

(52) U.S. Cl.
CPC ............ *H01Q 1/3233* (2013.01); *H01Q 1/42* (2013.01); *H01Q 1/526* (2013.01); *H01Q 13/206* (2013.01); *H01Q 21/0075* (2013.01); *H01Q 21/065* (2013.01); *G01S 2007/027* (2013.01); *G01S 2007/028* (2013.01)

(58) Field of Classification Search
USPC .............................................. 342/1–4, 70–72
See application file for complete search history.

(56) References Cited

U.S. PATENT DOCUMENTS

| | | | | |
|---|---|---|---|---|
| 6,153,070 | A | 11/2000 | Maurer et al. | |
| 6,937,184 | B2 * | 8/2005 | Fujieda | G01S 7/03 342/1 |
| 8,013,775 | B2 * | 9/2011 | Woods | H01L 23/552 342/1 |
| 9,110,162 | B2 * | 8/2015 | Matsuzawa | H01Q 1/3233 |
| 9,157,986 | B2 * | 10/2015 | Waldschmidt | G01S 7/032 |
| 2001/0040524 | A1 * | 11/2001 | Suzuki | G01S 7/032 342/70 |
| 2003/0098786 | A1 * | 5/2003 | Bishop | B60Q 1/22 340/435 |
| 2004/0036645 | A1 * | 2/2004 | Fujieda | G01S 7/03 342/70 |
| 2004/0227663 | A1 * | 11/2004 | Suzuki | G01S 7/03 342/70 |
| 2006/0152406 | A1 * | 7/2006 | Leblanc | G01S 7/032 342/175 |
| 2007/0216587 | A1 | 9/2007 | Schmidt et al. | |
| 2009/0122138 | A1 * | 5/2009 | Bischoff | B60R 11/04 348/148 |
| 2009/0250794 | A1 | 10/2009 | St. Germain et al. | |
| 2014/0070982 | A1 * | 3/2014 | Inada | B60R 19/483 342/188 |
| 2014/0368375 | A1 * | 12/2014 | Baftiu | H01Q 17/00 342/70 |

FOREIGN PATENT DOCUMENTS

| | | |
|---|---|---|
| DE | 102011114850 | 4/2013 |
| DE | 112012001758 | 2/2014 |
| DE | 102012017669 | 3/2014 |
| EP | 0642190 | 12/1993 |
| EP | 1398647 | 3/2004 |
| EP | 1462817 | 9/2004 |
| EP | 1471598 | 10/2004 |
| EP | 1762860 | 3/2007 |
| EP | 1898231 | 3/2008 |
| WO | 2015050994 | 4/2015 |
| WO | 2015094538 | 6/2015 |

* cited by examiner

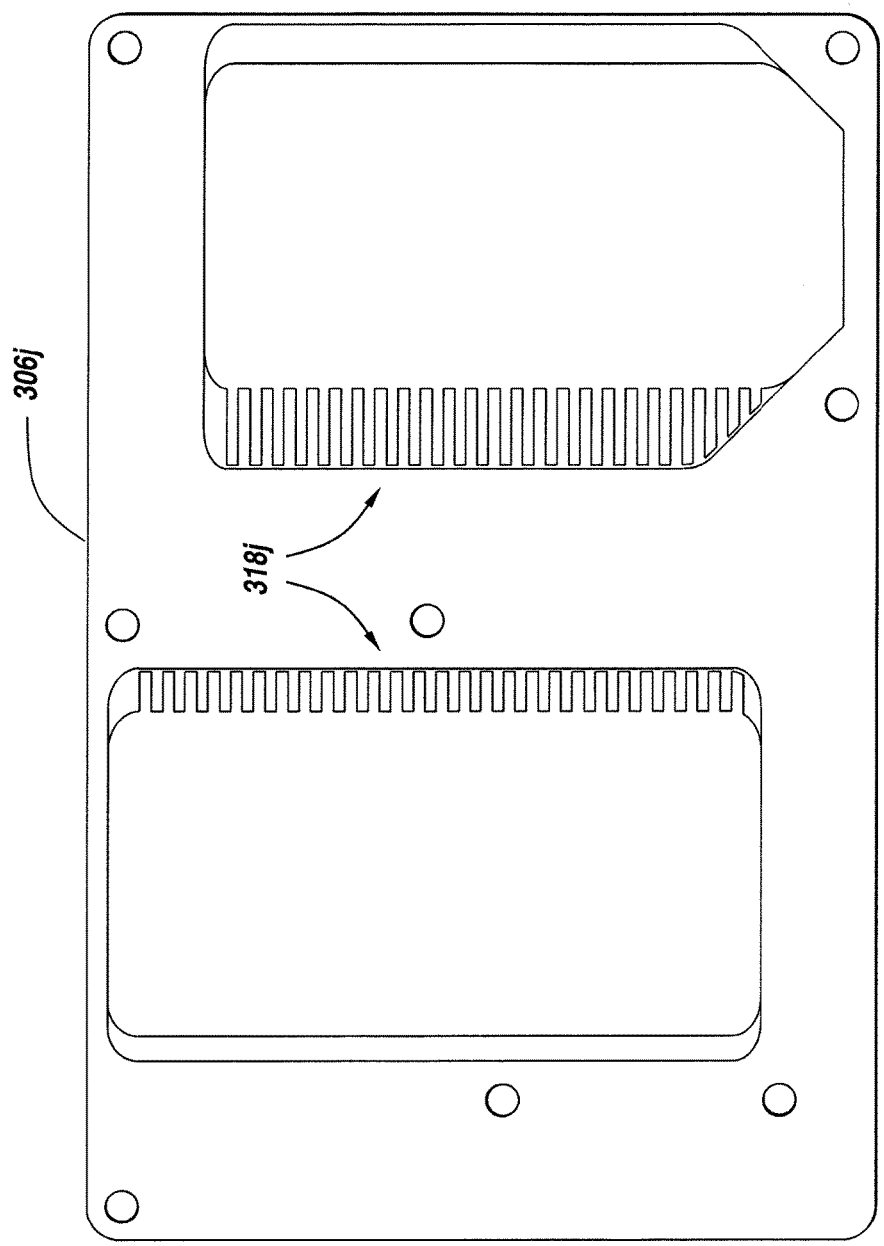

APPARATUS AND METHOD FOR MITIGATING MULTIPATH EFFECTS AND IMPROVING ABSORPTION OF AN AUTOMOTIVE RADAR MODULE

BACKGROUND

1. Technical Field

The present disclosure is related to automotive radar systems and, in particular, to an apparatus and method for reducing multipath effects and improving absorption in an automotive radar module package.

2. Discussion of Related Art

In radar systems, "multipath" refers to the propagation effect in which radar signals reach the receive antenna by two or more paths. In particular, in automotive radar systems, multipath signals can be generated by reflection of radar signals from the ground and/or from buildings. Another important source of multipath signals in automotive radar systems is reflection from the radar module package and the mounting structures by which the radar module is mounted within the automobile.

Multipath propagation can introduce constructive and destructive interference and phase shifting of the radar signals. Undesirable effects, such as ghosting, fading and jittering, can result. In the case of automotive radar systems, multipath is the dominant contributor to radar bearing detection ambiguities.

SUMMARY

According to a first aspect, a radar system with reduced multipath effects is provided. The radar system includes a radar sensor module having a first component on which at least one antenna element is formed, the at least one antenna element having a surface at which radar radiation is received or transmitted, the at least one antenna element having a radiation aperture. The system further includes a second component in proximity to the antenna element such that a portion of the radar radiation impinges on the second component, the second component comprising an angled surface forming an angle with the surface of the antenna element. The angled surface of the second component includes a texture such that when the portion of the radiation impinges on the angled surface, the amount of multipath signal propagating through, i.e., entering and/or exiting, the radiation aperture of the antenna element is reduced.

In some exemplary embodiments, the second component is a shield in the radar sensor module. In some exemplary embodiments, the second component is a mounting bracket for mounting the radar sensor module. The mounting bracket can mount the radar sensor module within an automobile.

In some exemplary embodiments, the radar sensor module is an automotive radar sensor module.

In some exemplary embodiments, the texture comprises a plurality of protrusions protruding out of the angled surface of the second component. The protrusions can be strip-shaped, pyramid-shaped, grid-shaped, slot-shaped, conical, triangular, rectangular, circular, spherical, and/or any combination of the foregoing shapes.

In some exemplary embodiments, the texture comprises a plurality of indentations protruding into the angled surface of the second component. The indentations can be strip-shaped, pyramid-shaped, grid-shaped, slot-shaped, conical, triangular, rectangular, circular, spherical, and/or any combination of the foregoing shapes.

In some exemplary embodiments, the texture comprises a material that at least partially reflects the radar radiation. In some exemplary embodiments, the texture comprises a material that at least partially absorbs the radar radiation.

In some exemplary embodiments, the second component comprises a material that at least partially reflects the radar radiation. In some exemplary embodiments, the second component comprises a material that at least partially absorbs the radar radiation.

In some exemplary embodiments, the angle between the angled surface and the surface of the antenna element is an obtuse angle. In some exemplary embodiments, the angle between the angled surface and the surface of the antenna element is an acute angle. In some exemplary embodiments, the angle between the angled surface and the surface of the antenna element is approximately 90 degrees.

In some exemplary embodiments, the antenna element is formed on a printed circuit board.

In some exemplary embodiments, the at least one antenna element is a transmit antenna element. In some exemplary embodiments, the at least one antenna element is a receive antenna element.

In some exemplary embodiments, the at least one antenna element comprises a plurality of antenna elements. In some exemplary embodiments, at least one of the plurality of antenna elements is a transmit antenna element, and at least one other of the plurality of antenna elements is a receive antenna element.

According to another aspect, a method of making a radar system with reduced multipath effects is provided. According to the method, at least one antenna element is formed on a first component of a radar sensor module, the at least one antenna element having a surface at which radar radiation is received or transmitted, the at least one antenna element having a radiation aperture. A second component is located in proximity to the antenna element such that a portion of the radar radiation impinges on the second component. An angled surface is formed on the second component, the angled surface forming an angle with the surface of the antenna element. A texture is formed on the angled surface of the second component such that when the portion of the radiation impinges on the angled surface, the amount of multipath signal propagating through, entering and/or exiting, the radiation aperture of the antenna element is reduced.

In some exemplary embodiments, the second component is a shield in the radar sensor module. In some exemplary embodiments, the second component is a mounting bracket for mounting the radar sensor module. The mounting bracket can mount the radar sensor module within an automobile.

In some exemplary embodiments, the radar sensor module is an automotive radar sensor module.

In some exemplary embodiments, the texture comprises a plurality of protrusions protruding out of the angled surface of the second component. The protrusions can be strip-shaped, pyramid-shaped, grid-shaped, slot-shaped, conical, triangular, rectangular, circular, spherical, and/or any combination of the foregoing shapes.

In some exemplary embodiments, the texture comprises a plurality of indentations protruding into the angled surface of the second component. The indentations can be strip-shaped, pyramid-shaped, grid-shaped, slot-shaped, conical, triangular, rectangular, circular, spherical, and/or any combination of the foregoing shapes.

In some exemplary embodiments, the texture comprises a material that at least partially reflects the radar radiation. In some exemplary embodiments, the texture comprises a material that at least partially absorbs the radar radiation.

In some exemplary embodiments, the second component comprises a material that at least partially reflects the radar radiation. In some exemplary embodiments, the second component comprises a material that at least partially absorbs the radar radiation.

In some exemplary embodiments, the angle between the angled surface and the surface of the antenna element is an obtuse angle. In some exemplary embodiments, the angle between the angled surface and the surface of the antenna element is an acute angle. In some exemplary embodiments, the angle between the angled surface and the surface of the antenna element is approximately 90 degrees.

In some exemplary embodiments, the antenna element is formed on a printed circuit board.

In some exemplary embodiments, the at least one antenna element is a transmit antenna element. In some exemplary embodiments, the at least one antenna element is a receive antenna element.

In some exemplary embodiments, the at least one antenna element comprises a plurality of antenna elements. In some exemplary embodiments, at least one of the plurality of antenna elements is a transmit antenna element, and at least one other of the plurality of antenna elements is a receive antenna element.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIGS. 11A and 11B include schematic top views of EMI shield components of an automotive radar module, illustrating various texture patterns for mitigation of multipath effects, according to exemplary embodiments.

DETAILED DESCRIPTION

Figure 1:
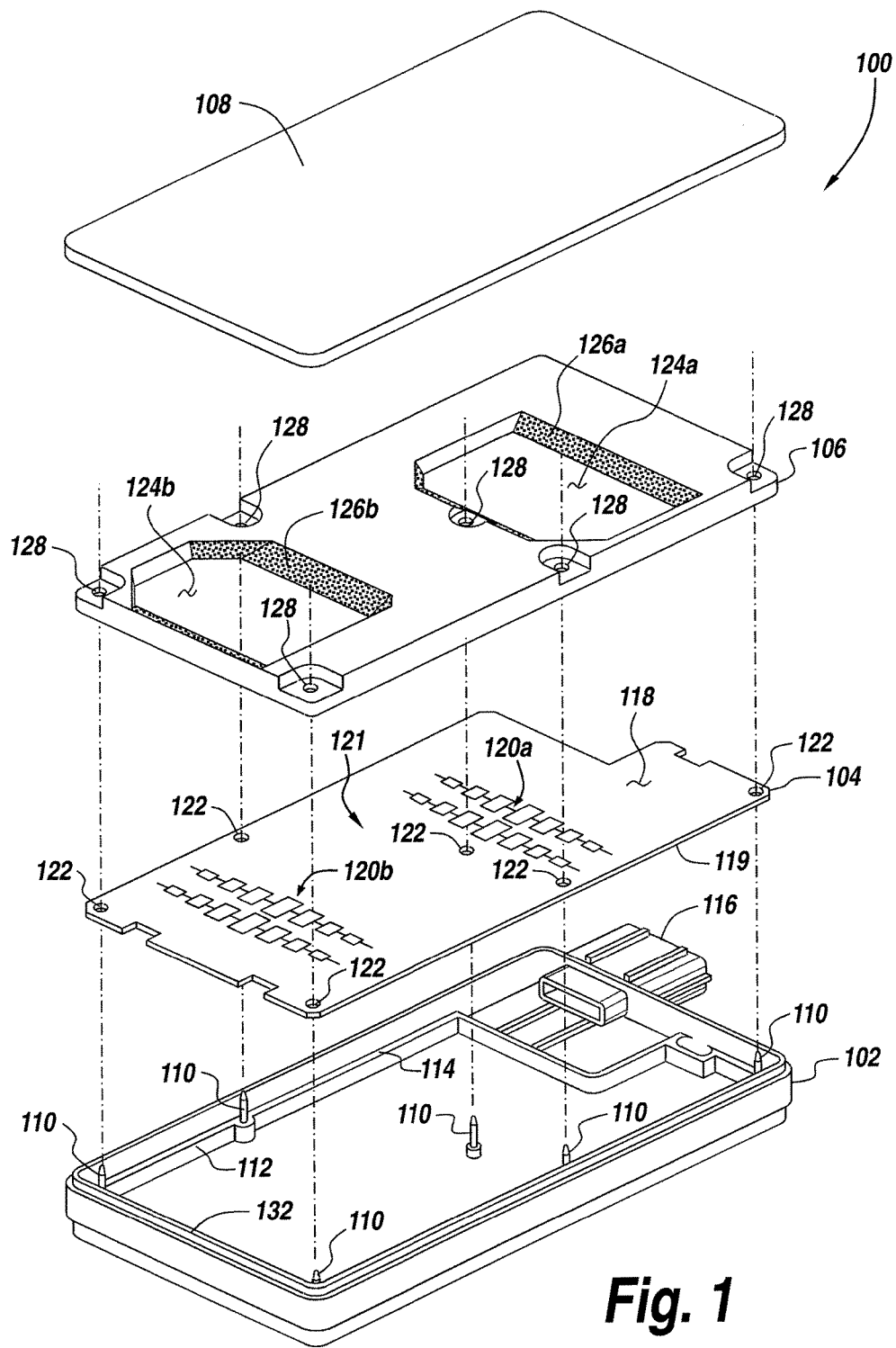
FIG. 1 includes a schematic exploded perspective view of an automotive radar module, taken from above the module, according to some exemplary embodiments.
Figure 2:
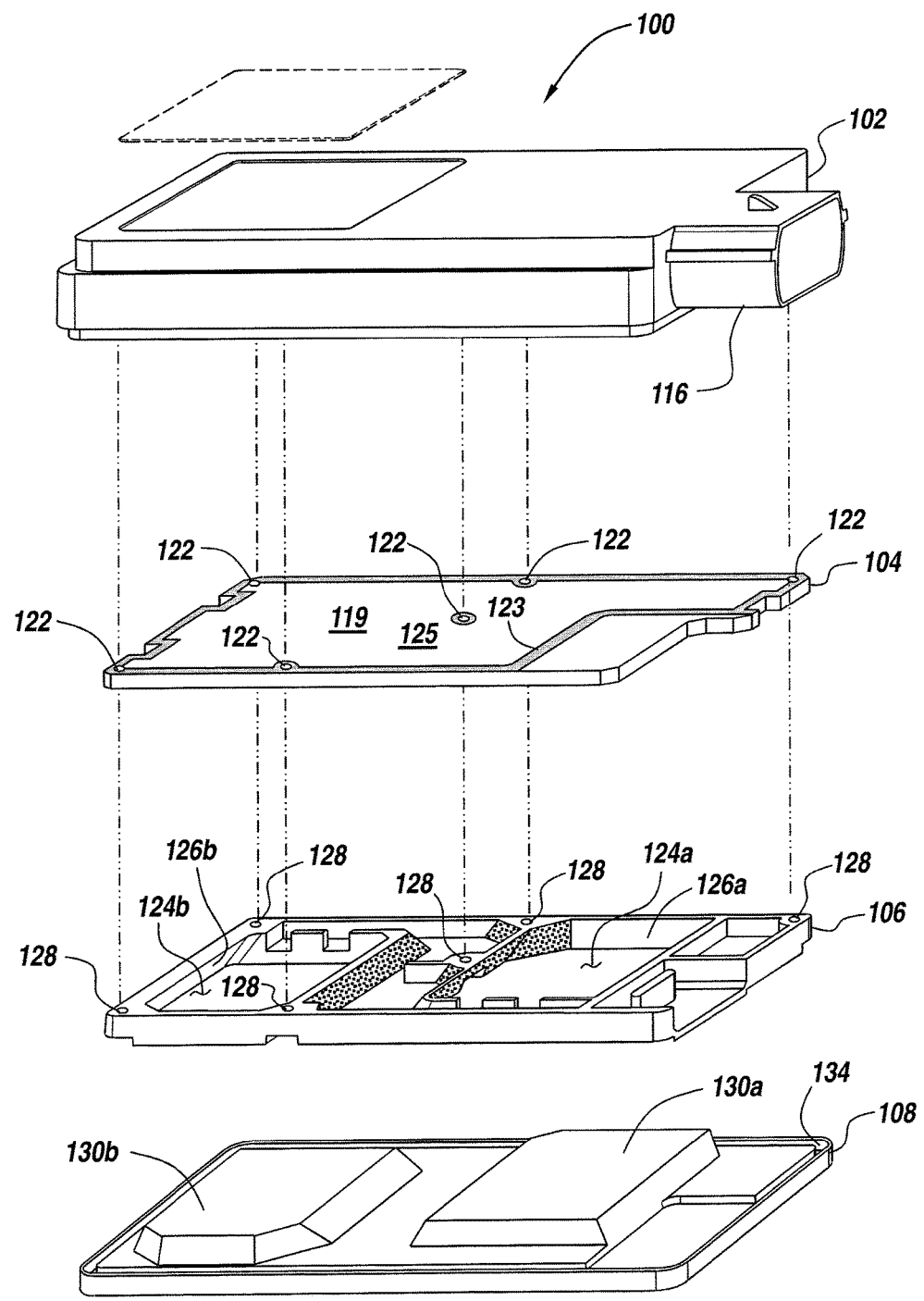
FIG. 2 includes another schematic exploded perspective view of the automotive radar module of FIG. 1, taken from below the module, according to some exemplary embodiments.

FIGS. 1 and 2 include schematic exploded perspective views of an automotive radar module taken from different view perspectives. Specifically, FIG. 1 includes a schematic exploded perspective view of an automotive radar module, taken from above the module, according to some exemplary embodiments; and FIG. 2 includes another schematic exploded perspective view of the automotive radar module, taken from below the module, according to some exemplary embodiments.

Referring to FIGS. 1 and 2, according to some specific exemplary embodiments, automotive radar module 100 includes a housing or base 102 in which components of module 100 are mounted. Module 100 can also include a PCB 104, an EMI shield 106 and a radome or cover 108 disposed in a stacked configuration and assembled together. Housing 102 can be made of plastic and can be formed by injection molding. Housing 102 can be formed integrally with a shroud 116 for an electrical connector such that shielded electrical connections can be made to module 100. The use of plastic material for housing 102 facilitates laser welding of module radome or cover 108 to housing 102 to ensure a waterproof seal.

For the purpose of EMI shielding module 100, in some exemplary embodiments, the inner surface of housing 102 is conductive. To that end, the plastic material of housing 102 can be conductive plastic material. Alternatively, or additionally, a conductive plating or paint can be applied to the inside of housing 102. Housing 102 can also include integral heat stake posts 110 used to align PCB 104 via holes 122 and to align EMI shield 106 via holes 128 and to hold housing 102, PCB 104 and EMI shield 106 together. After a heat staking operation is performed on heat stake posts 110, a bottom surface 119 of PCB 104 is held tightly and permanently against conductive top surface 114 of PCB mounting shelf 112 integrally formed in housing 102. Similarly, EMI shield 106 is held tightly and permanently against a top surface 118 of PCB 104.

Antenna patch patterns 120a and 120b, formed on top surface 118 of PCB 104, are can also be EMI shielded according to exemplary embodiments. When EMI shield 106 is assembled over top surface 118 of PCB 104, apertures 124a and 124b are disposed to surround and, therefore, expose, antenna patch patterns 120a and 120b.

Figure 3B:
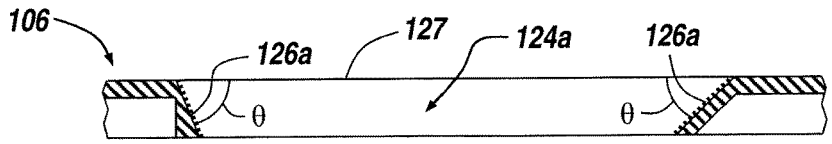
FIG. 3B includes a schematic cross-sectional view of the EMI shield of FIG. 3A, taken along line 3B-3B of FIG. 3A.
Figure 3A:
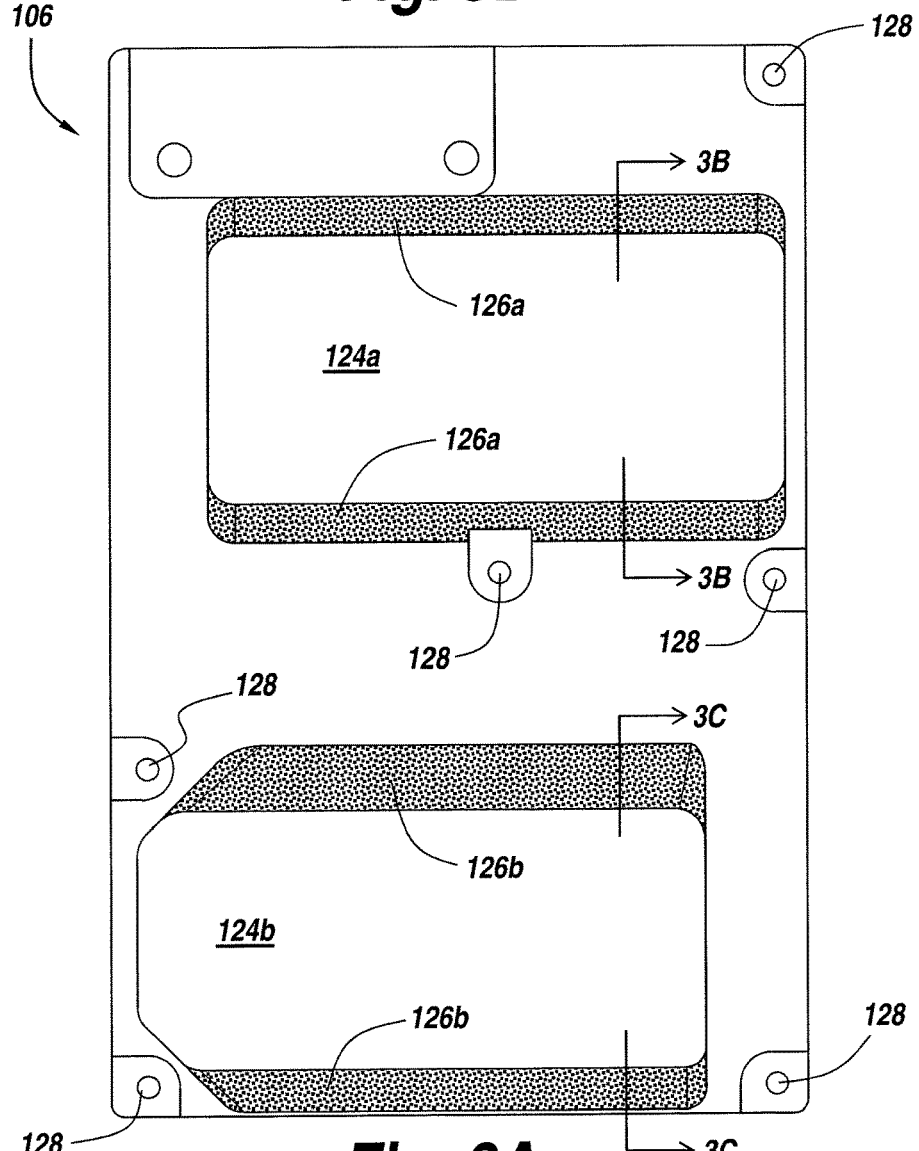
FIG. 3A includes a schematic top view of an EMI shield of the automotive radar module of FIGS. 1 and 2, according to some exemplary embodiments.
Figure 3C:
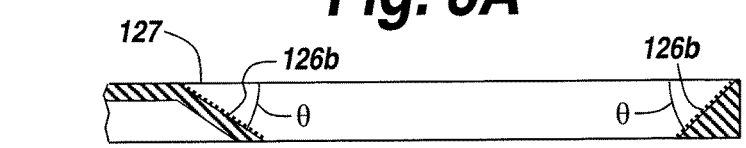
FIG. 3C includes a schematic cross-sectional view of the EMI shield of FIG. 3A, taken along line 3C-3C of FIG. 3A.

FIGS. 3A through 3C illustrate EMI shield 106 in detail. Specifically, FIG. 3A includes a schematic top view of EMI shield 106, according to some exemplary embodiments; FIG. 3B includes a schematic cross-sectional view of EMI shield 106, taken along line 3B-3B of FIG. 3A; and FIG. 3C includes a schematic cross-sectional view of EMI shield 106, taken along line 3C-3C of FIG. 3A. According to some embodiments, EMI shield 106 is formed of plastic and can be formed by injection molding. In some embodiments, the plastic is conductive plastic to provide EMI shielding characteristics. To further enhance EMI shielding, EMI shield 106 can also be formed with RF absorptive filler materials. Referring to FIGS. 1 through 3C, when module 100 is assembled via heat stake posts 110, the bottom surface of EMI shield 106 is held tightly and permanently against top surface 118 of PCB 104. The portions of the bottom surface of EMI shield 106 located around the perimeters of apertures 124a and 124b are held tightly against conductive traces on PCB 104, such that apertures 124a and 124b define cavities electrically sealed to PCB 104 above antenna patch patterns 120a and 120b, respectively.

According to some exemplary embodiments, the EMI shielding performance is enhanced by sidewalls 126a, 126b of apertures 124a, 124b, respectively, in EMI shield 106. Referring to FIGS. 3A through 3C, sidewalls 126a and 126b are formed at a non-perpendicular slope with respect to the top surface of EMI shield 106. That is, sidewalls 126a, 126b are formed at some predetermined acute angle θ with respect to the plane 127 of the top surface of EMI shield 106. It is noted that the reference numeral 126a is used to identify generally any of the sidewalls of aperture 124a, and the reference numeral 126b is used to identify generally any of the sidewalls of aperture 124b. Each of the sidewalls can be formed at a different angle θ with respect to plane 127, or they can be formed at the same angle θ. The illustrations herein of the sidewalls of apertures 124a and 124b show the sidewalls at different angles θ to illustrate the generality of the selection of the angles θ.

According to exemplary embodiments, the angles θ determine the shapes of the shielding cavities above antenna patch patterns 120a and 120b on PCB 104. The angles θ are selected such that the cavities provide shielding characteristics according to operational parameters and characteristics of module 100 in a present desired application. Such operational parameters and characteristics can include, for example, frequency and/or power level target radiation for EMI shielding. In some exemplary embodiments, the angles θ can be selected to maximize the size of apertures 124a, 124b.

Additionally, or alternatively, according to some exemplary embodiments, one or more sidewalls 126a and 126b of apertures 124a and 124b, respectively, can be formed with a texture to enhance EMI shielding. The texture is illustrated in FIGS. 1-3C on some sidewalls 126a and 126b. The texture can be a plurality of protrusions protruding from the surfaces of one or more of sidewalls 126a and 126b, or the texture can be a plurality of indentations protruding into the surfaces of one or more of sidewalls 126a and 126b, or the texture can be a combination of protrusions protruding from surfaces of one or more of sidewalls 126a and 126b and indentations protruding into surfaces of one or more of sidewalls 126a and 126b. The texture can be formed integrally with shield 106, and can be absorptive, reflective or a combination of absorptive and reflective portions. The configuration and properties of the texture are selected based on the desired EMI shielding performance in the operational environment in which radar module 100 is to be used.

It is noted that the reference numeral 126a is used to identify generally any of the sidewalls of aperture 124a, and the reference numeral 126b is used to identify generally any of the sidewalls of aperture 124b. Each of the sidewalls can be formed with or without texture, as desired. Also, the type of texture, i.e., absorptive, reflective, protruding, indenting, etc., formed on each sidewall can be varied from sidewall to sidewall or even from region to region within a particular sidewall. Throughout the present detailed description and the accompanying drawings, illustration of a sidewall with or without a texture and the type of texture illustrated and/or described, are to be considered exemplary only. The illustrations herein of the sidewalls of apertures 124a and 124b show the sidewalls with different textures and/or without textures to illustrate the generality of the selection of the textures.

Figure 4A:
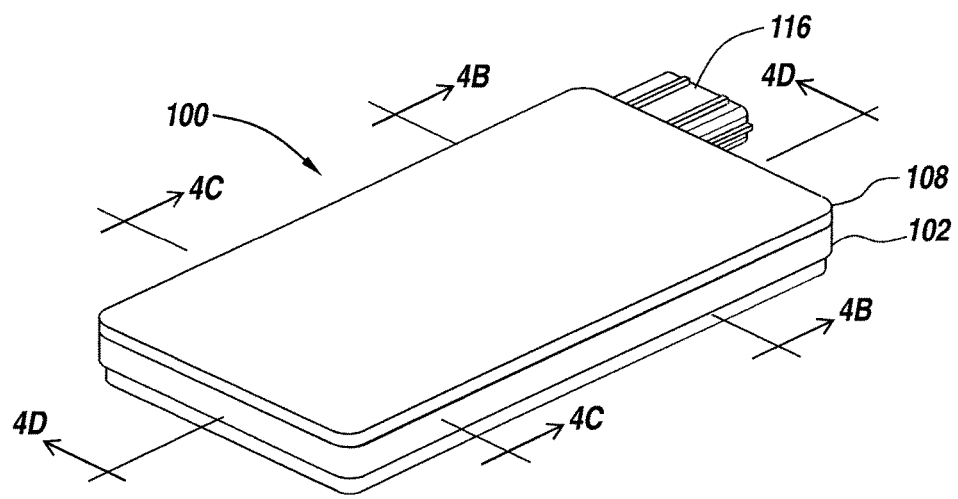
FIG. 4A includes a schematic perspective view of the automotive radar module of FIGS. 1 and 2, with the module assembled, according to some exemplary embodiments.
Figure 4B:
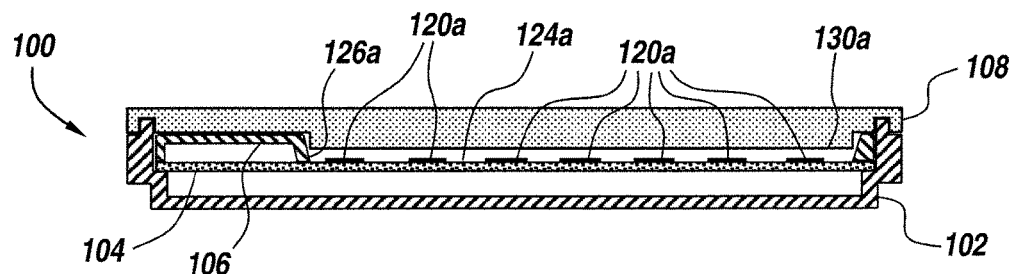
FIG. 4B includes a schematic cross-sectional view of the automotive radar module of FIG. 9A, taken along line 4B-4B of FIG. 4A.
Figure 4C:
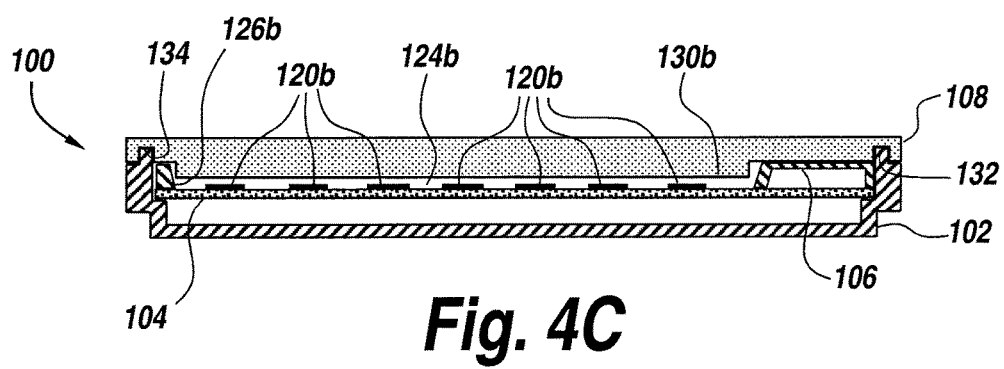
FIG. 4C includes a schematic cross-sectional view of the automotive radar module of FIG. 4A, taken along line 4C-4C of FIG. 4A.
Figure 4D:
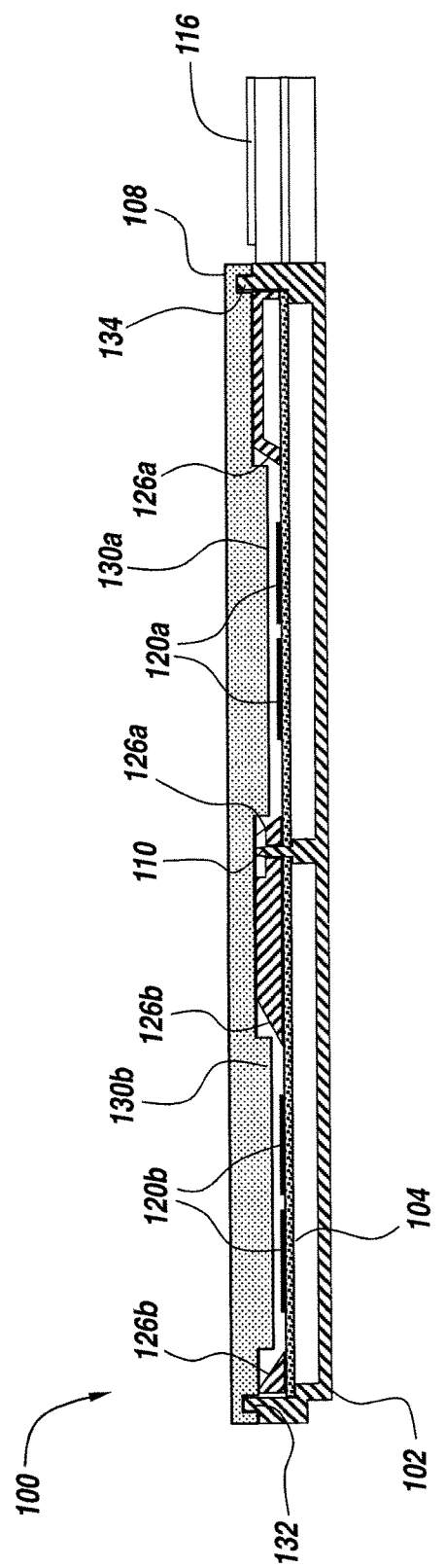
FIG. 4D includes a schematic cross-sectional view of the automotive radar module of FIG. 4A, taken along line 4D-4D of FIG. 4A.

FIG. 4A includes a schematic perspective view of automotive radar module 100 of FIGS. 1 through 3C, with module 100 assembled, according to some exemplary embodiments. FIG. 4B includes a schematic cross-sectional view of automotive radar module 100 of FIG. 4A, taken along line 4B-4B of FIG. 4A. FIG. 4C includes a schematic cross-sectional view of automotive radar module 100 of FIG. 4A, taken along line 4C-4C of FIG. 4A. FIG. 4D includes a schematic cross-sectional view automotive radar module 100 of FIG. 4A, taken along line 4D-4D of FIG. 4A.

Referring to FIG. 4A, the exemplary module 100 according to the disclosure is illustrated as including radome or cover 108 sealed to housing 102. Connector shroud 116, integrally formed with housing 102, is also shown. Referring to FIGS. 4B through 4D, PCB 104 is shown mounted in housing 102. EMI shield 106 is shown mounted over PCB 104. Radome 108 is attached to housing 102 via the mating of groove 134 of radome 108 with raised boss 132 on housing 102. Aperture 124a in EMI shield 106 exposes antenna patch pattern 120a on PCB 104. Sloped, angled sidewalls 126a of aperture 124a together with protrusion 130a of radome 108 form the sealed cavity for EMI shielding of antenna patch pattern 120a. Similarly, aperture 124b in EMI shield 106 exposes antenna patch pattern 120b on PCB 104. Sloped, angled sidewalls 126b of aperture 124b together with protrusion 130b of radome 108 form the sealed cavity for EMI shielding of antenna patch pattern 120b. Any of sloped, angled sidewalls 120a and 120b can include the texture of the present disclosure, in any configuration, depending on the desired EMI shielding performance.

Figure 5A:
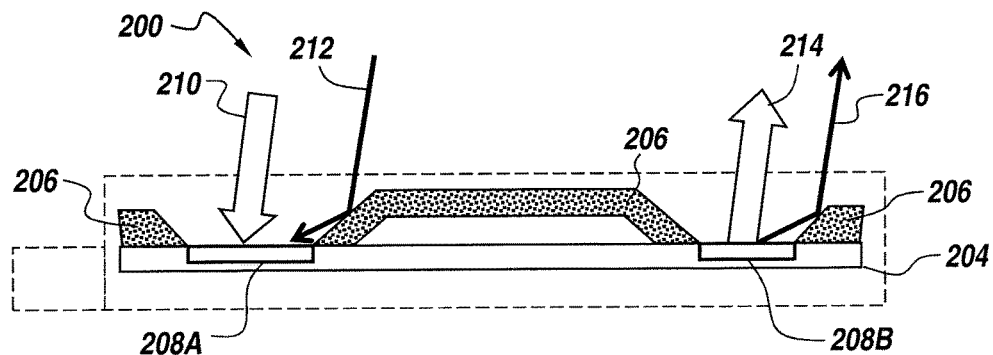
FIG. 5A includes a schematic cross-sectional view of portions of an automotive radar module which schematically illustrates multipath effects in connection with a reflective and/or absorptive shield component.
Figure 5B:
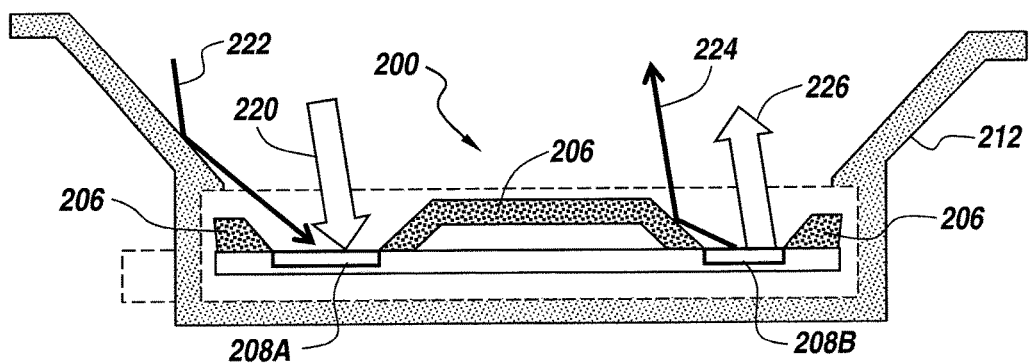
FIG. 5B includes a schematic cross-sectional view of portions of an automotive radar module which schematically illustrates multipath effects in connection with a reflective and/or absorptive radar module mounting fixture or bracket.

FIG. 5A includes a schematic cross-sectional view of portions of an automotive radar module which schematically illustrates multipath effects in connection with a reflective and/or absorptive shield component. FIG. 5B includes a schematic cross-sectional view of portions of an automotive radar module which schematically illustrates multipath effects in connection with a reflective and/or absorptive radar module mounting fixture or bracket. Referring to FIGS. 5A and 5B, the mechanisms by which multipath signals reflected from an EMI radar shield 206 and/or a mounting fixture or bracket 212 propagate through the effective radar aperture are illustrated. As shown in FIGS. 5A and 5B, automotive radar module 200, which can be the same as or an alternative to automotive radar module 100 illustrated in FIGS. 1-4D, includes an EMI shield component 206 over a printed circuit board 204 on which transmit and/or receive antenna patterns are formed. It will be noted that the illustrations of FIGS. 1-4D and the detailed description thereof is applicable to the automotive radar module 200 illustrated in FIGS. 5A and 5B. As described above in detail, openings in shield 206 define effective radar apertures 208A and 208B. In the specific exemplary illustration of FIGS. 5A and 5B, aperture 208A is a receive radar aperture through which radiation reaches a receive antenna pattern formed on PCB 204, and aperture 208B is a transmit radar aperture through which radiation transmitted by a transmit antenna pattern on PCB 204 is transmitted out of automotive radar module 200. As illustrated in FIG. 5B, radar module 200 can be mounted, for example, in an automobile, by a mounting fixture or bracket 212.

Referring to FIG. 5A, arrow 210 indicates the radar signal reflected from a target and received directly from the target through effective radiation aperture 208A. Arrow 212 indicates a radar signal also reflected from the target, but received in effective radiation aperture 208A, i.e., propagating through effective radiation aperture 208A, after reflection from the angled sidewall of EMI shield 206. This reflected signal is a multipath signal which results in radar pattern distortion and non-monotonic radar bearing detection as illustrated below in the graphs of FIGS. 6A and 6B. Also, referring to FIG. 5A, arrow 214 illustrates the radar signal transmitted by automotive radar module 200 directed out of effective radar aperture 208B to a target. Arrow 216 illustrates a radar signal which is reflected from the angled sidewall of EMI shield 206 indirectly out of effective radar aperture 208B to the target. This reflected signal propagating through, i.e., indirectly exiting, effective radar aperture 208B also contributes to the multipath effect.

Arrow 220 indicates the radar signal reflected from a target and received directly from the target through effective radiation aperture 208A. Arrow 222 indicates a radar signal also reflected from the target, but propagating through, i.e., received in, the effective radiation aperture 208A after reflection from the angled sidewall of mounting fixture or bracket 212. This reflected signal is a multipath signal which results in radar pattern distortion and non-monotonic radar bearing detection as illustrated below in the graphs of FIGS. 6A and 6B. Also, referring to FIG. 5B, arrow 226 illustrates the radar signal transmitted by radar module 200 directed out of effective radar aperture 208B to a target. Arrow 224 illustrates a radar signal which is reflected from the angled sidewall of EMI shield 206 indirectly out of effective radar aperture 208B to the target. This reflected signal propagating through, i.e., indirectly exiting, effective radar aperture 208B also contributes to the multipath effect.

Figure 6A:
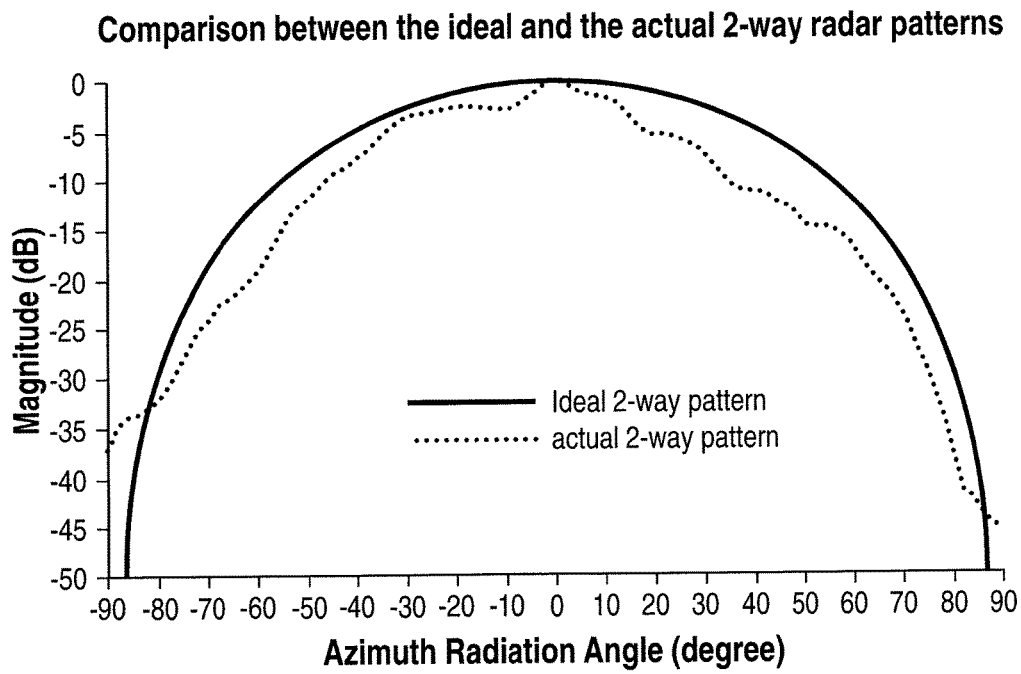
FIG. 6A includes a graph of magnitude versus azimuth radiation angle for both the ideal two-way radiation pattern and the actual two-way radiation pattern in which the multipath effects are taken into consideration.
Figure 6B:
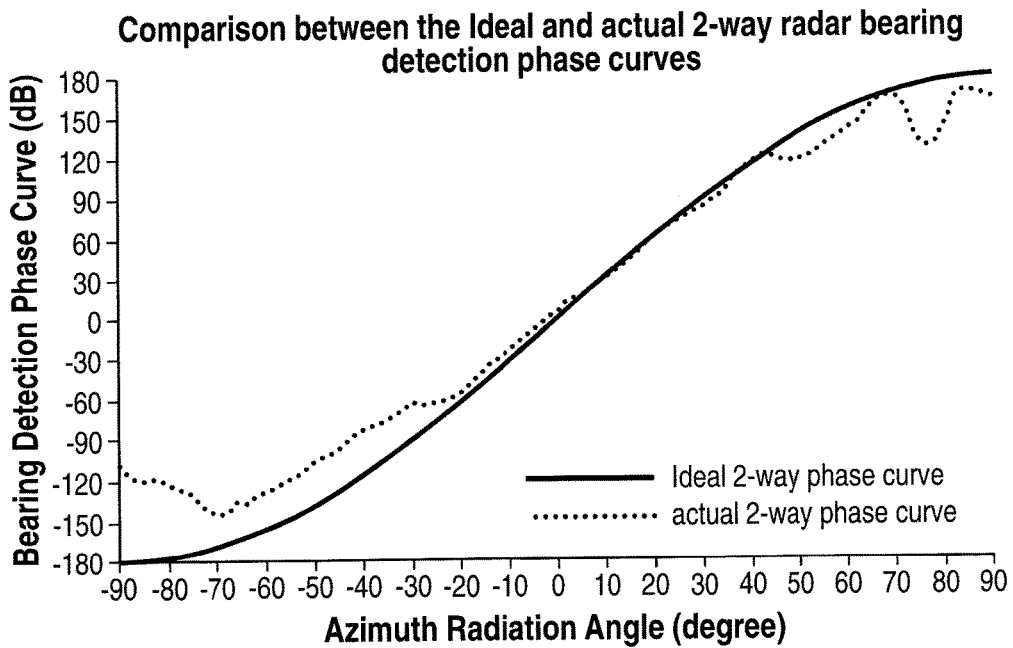
FIG. 6B includes a graph of bearing detection phase versus azimuth radiation angle for both the ideal two-way radiation pattern and the actual two-way radiation pattern in which the multipath effects are taken into consideration.

FIG. 6A includes a graph of magnitude versus azimuth radiation angle for both the ideal two-way radiation pattern and the actual two-way radiation pattern in which the multipath effects are taken into consideration. FIG. 6B includes a graph of bearing detection phase versus azimuth radiation angle for both the ideal two-way radiation pattern and the actual two-way radiation pattern in which the multipath effects are taken into consideration. Referring to FIGS. 5A, 5B, 6A and 6B, the multipath effect causes the pattern distortion and non-monotonic radar bearing detection phase curve illustrated in the graphs of FIGS. 6A and 6B, respectively.

Since most types of materials used in EMI shields and/or mounting fixtures or brackets present reflection characteristics which may distort the pattern shape and the phase curve monotonicity illustrated in FIGS. 6A and 6B, according to exemplary embodiments, the reflection field can be minimized or reduced by applying some predetermined geometric, i.e., shape, alterations/modifications to the EMI shield and/or the mounting fixture or bracket.

Figure 7A:
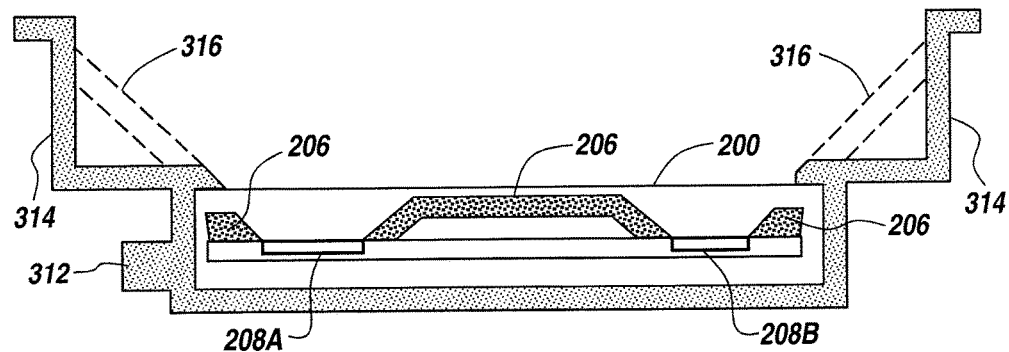
FIG. 7A includes a schematic cross-sectional view of portions of an automotive radar module mounted in a mounting fixture or bracket, which schematically illustrates an approach to mitigating multipath effects using a selected shape of the mounting fixture or bracket, according to some exemplary embodiments.
Figure 7B:
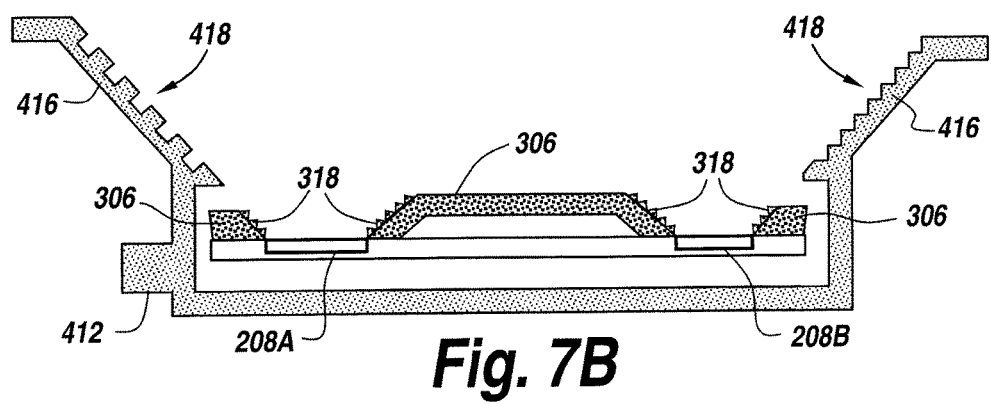
FIG. 7B includes a schematic cross-sectional view of portions of an automotive radar module mounted in a mounting fixture or bracket, which schematically illustrates an approach to mitigating multipath effects by forming one or more textured surfaces on the shield of the radar module and/or the mounting fixture or bracket, according to some exemplary embodiments.

FIG. 7A includes a schematic cross-sectional view of portions of an automotive radar module mounted in a mounting fixture or bracket, which schematically illustrates an approach to mitigating multipath effects using a selected shape of the mounting fixture or bracket, according to some exemplary embodiments. FIG. 7B includes a schematic cross-sectional view of portions of an automotive radar module mounted in a mounting fixture or bracket, which schematically illustrates an approach to mitigating multipath effects by forming one or more textured surfaces on the shield of the radar module and/or the mounting fixture or bracket, according to some exemplary embodiments.

Referring to FIG. 7A, according to exemplary embodiments, an approach to mitigating the multipath effect is to avoid angled large reflective surfaces. For example, as shown in FIG. 7A, the angled surfaces 316 can be removed (as indicated by the dashed lines) and replaced with angled steps 314. The angled steps 314 can form an angle of 90 degrees, or less. The result is that these angled-step surfaces 314 deflect the multipath signals out of the effective radar aperture 208A and 208B.

In addition to the angled-step surfaces, or as an alternative to the angled-step surfaces 314, referring to FIG. 7B, certain types of textures can be formed in or on the surfaces of EMI shield 306 and/or mounting fixture or bracket 412. These textures can be molded or casted into the fixture/bracket and/or shield on the surfaces of interest. They can also be adhered to the surfaces as needed. The textures can be reflective, absorptive and/or a combination of reflective and absorptive. As a result of these surfaces, multipath signals are attenuated to a great extent. Referring to FIG. 7B, a texture 418 can be formed on a surface 416 of mounting fixture or bracket 412. It is noted that surface 416 is illustrated as a straight angled surface. It will be understood that texture 418 can also be used in combination with angled step surfaces of the type illustrated and described above in detail in connection with FIG. 7A. Also, texture 318 can be used on one or more surfaces of EMI shield 306. Different textures can be added to angled surfaces to scatter, deflect, and/or attenuate the multipath signals, and, therefore, minimize their impact on the effective radiation aperture.

According to the exemplary embodiments, the texture can be configured to realize one or more of at least three possible functions, namely, enhancing the absorption, scattering and/or reflection of the multipath signals. When the texture is used to enhance absorption, if the EMI shield 306 is made of a lossy plastic material, the texture 318 on the angled surfaces of shield 306 in the form of slot-shaped, grid-shaped, rectangular, circular and/or other shapes of structures can be used to trap the multipath signals and extend the passing length for radiation in the lossy structure. As a result, the multipath signal is attenuated, and its effect on the radar detection is reduced. Alternatively, texture 318 can be configured to allow the multipath signals to first be attenuated in a controlled fashion in the lossy structure and then pass through the shield structure past the sensor, instead of being reflected into the aperture 208A or 208B where they may interfere with the radar signals being processed. In this latter type of texture structure, openings in the form of slots or "potholes" shaped as described above perform like a lossy waveguide, and the guided wave is attenuated to a certain extent. Accordingly, in some exemplary embodiments, the slot direction or the longer side of the rectangular tapping structure can be configured to be perpendicular to the operating polarization direction. The dimensions of the slots and rectangular "honey comb" structures, the diameter of the circular potholes, and/or the dimensions of textures of other shapes, are proportional to the operating wavelength, such as one-half wavelength, full-wavelength, or other predetermined sizes, with certain material/air ratio depending on the material type and the area of interest of the material.

Figure 8A:
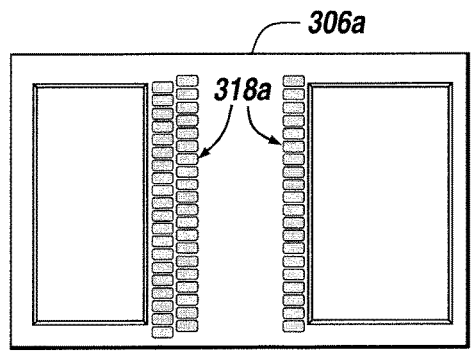
FIGS. 8A-8F include schematic top views of EMI shield components of an automotive radar module, illustrating various texture patterns for mitigation of multipath effects, according to exemplary embodiments.
Figure 8D:
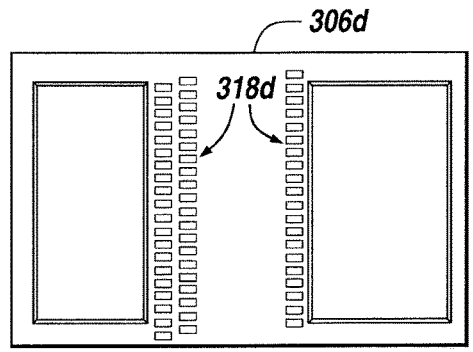
Figure 8B:
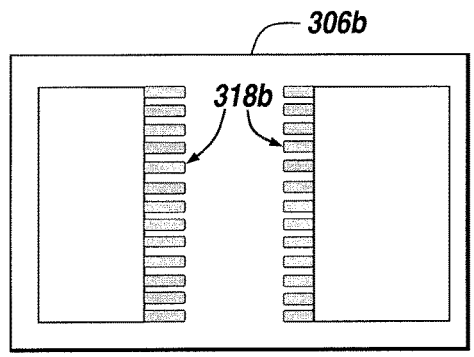
Figure 8E:
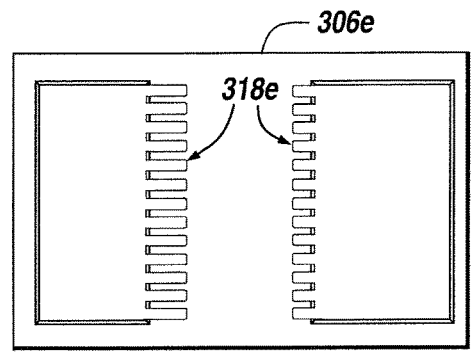
Figure 8C:
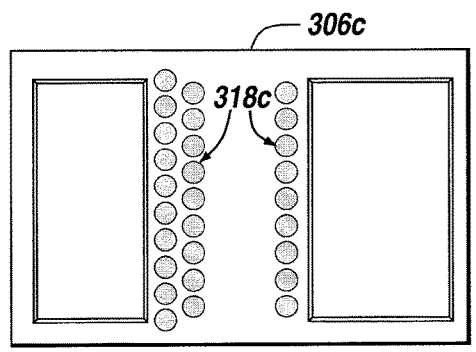
Figure 8F:
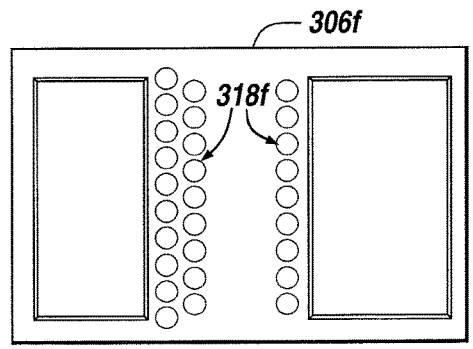

FIGS. 8A-8F include schematic top views of EMI shield components of an automotive radar module, illustrating various texture patterns for mitigation of multipath effects, according to exemplary embodiments. In FIGS. 8A, 8B, 8C, textures 318a, 318b, 318c, respectively, are made of regions of a lossy material, e.g., lossy plastic material, used to attenuate the multipath signals. Specifically, FIG. 8A illustrates a texture 318a having a pattern of lossy rectangular "honey comb" regions, FIG. 8B illustrates a texture 318b having a pattern of lossy rectangular slots, and FIG. 8C illustrates a texture 318c having a pattern of lossy circular regions. In FIGS. 8D, 8E, 8F, textures 318d, 318e, 318f, respectively, are made of regions in which material has been or is absent. Specifically, FIG. 8D illustrates a texture 318d having a pattern of open rectangular "honey comb" regions, FIG. 8E illustrates a texture 318e having a pattern of open rectangular slots, and FIG. 8C illustrates a texture 318c having a pattern of open circular regions or "potholes." As described above, openings in the form of slots or "potholes" shaped as described above perform like a lossy waveguide, and the guided wave is attenuated to a certain extent.

Figure 9A:
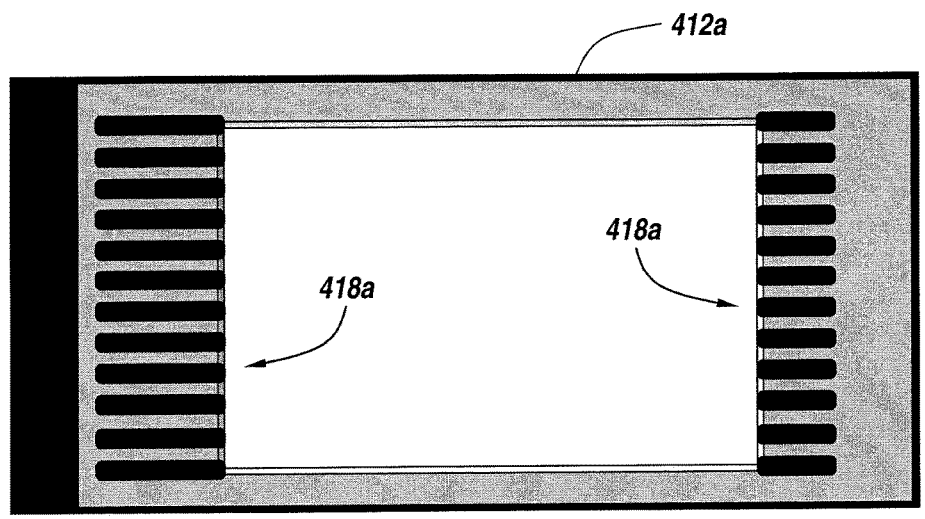
FIGS. 9A and 9B include schematic top views of a portion of a mounting fixture or bracket for an automotive radar module, illustrating various texture patterns for mitigation of multipath effects, according to exemplary embodiments.
Figure 9B:
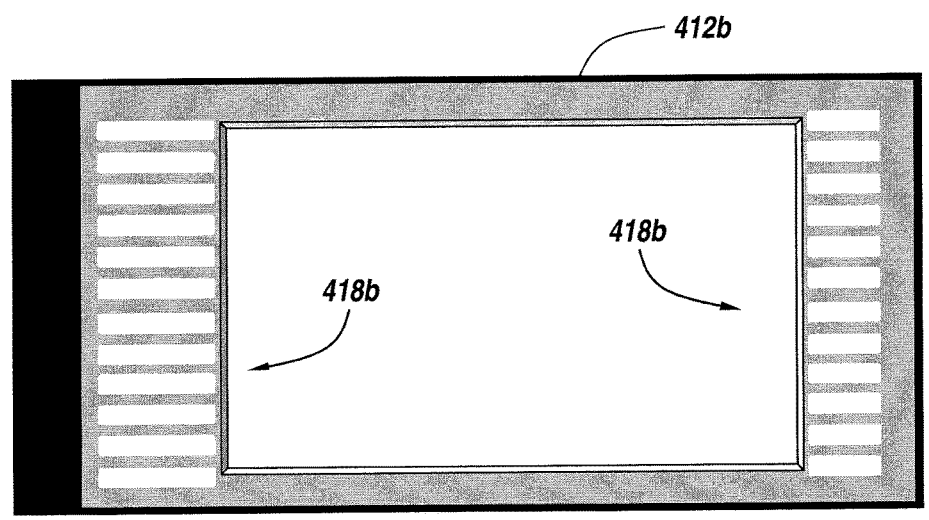

FIGS. 9A and 9B include schematic top views of a portion of a mounting fixture or bracket for an automotive radar module, illustrating various texture patterns for mitigation of multipath effects, according to exemplary embodiments. Specifically, FIG. 9A illustrates a texture 418a on mounting fixture or bracket 412a. Texture 418a includes a pattern of absorptive grid regions in the surface of mounting fixture or bracket 412a, which can be formed of a reflective material, such as molded reflective plastic. The absorptive grid regions attenuate the multipath signals to mitigate their effects on the radar system. FIG. 9B illustrates a texture 418b on mounting fixture or bracket 412b. Texture 418b includes a pattern of open slot regions in the surface of mounting fixture or bracket 412b, which can be formed of a reflective material, such as molded reflective plastic. As described above, the open slots perform like a lossy waveguide, and the guided wave is attenuated.

Figure 10A:
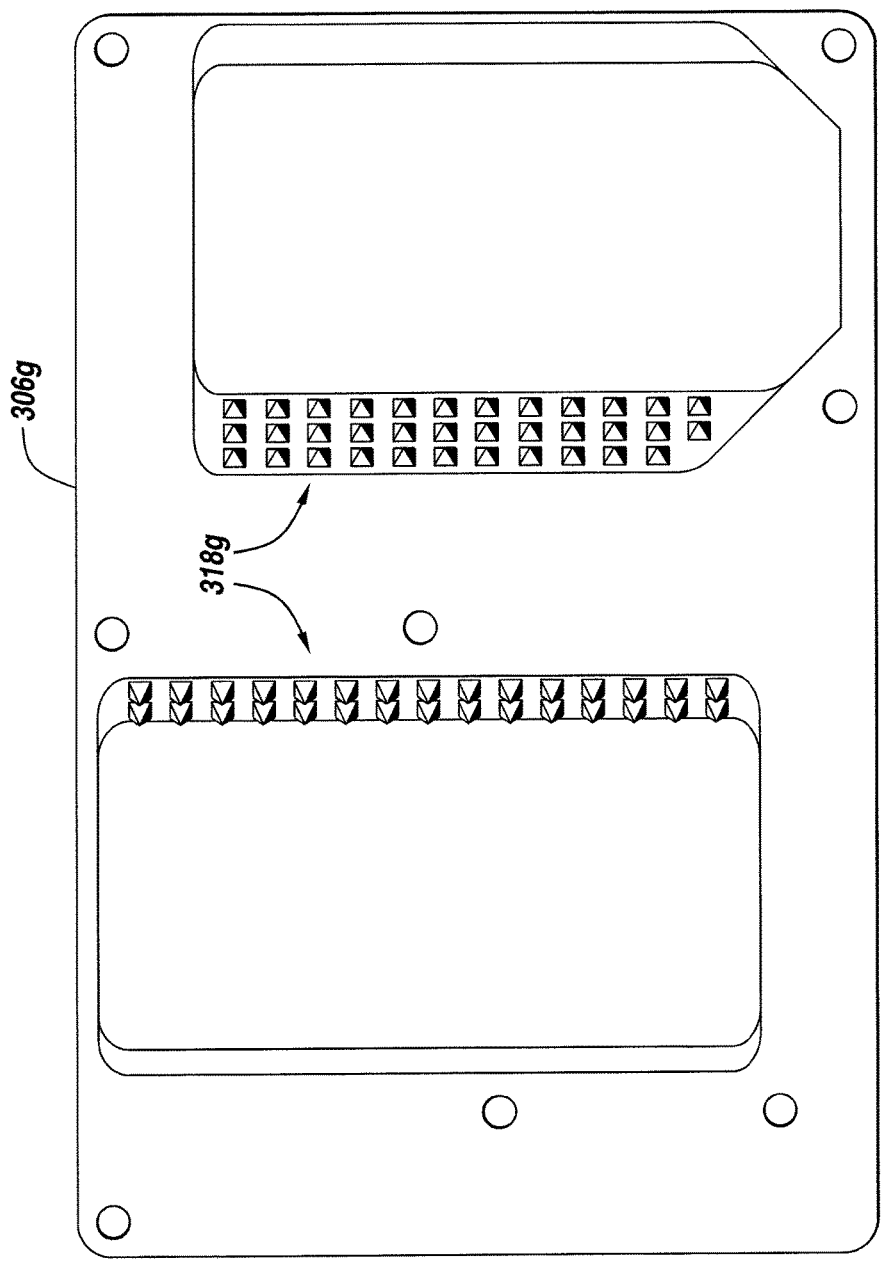
FIGS. 10A and 10B include schematic top views of EMI shield components of an automotive radar module, illustrating various texture patterns for mitigation of multipath effects, according to exemplary embodiments.
Figure 10B:
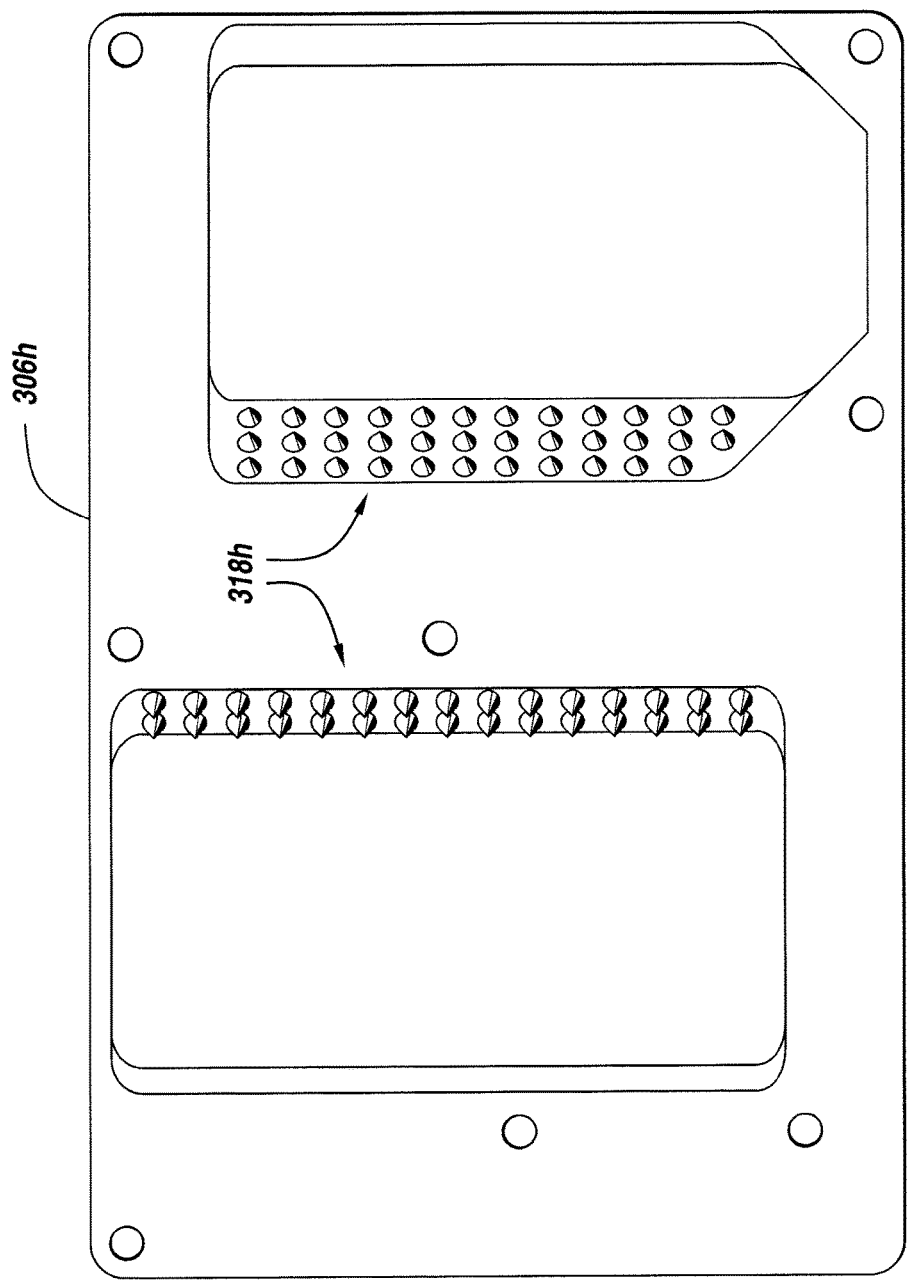

As described above, the intensity of multipath signals into the effective radar aperture can also be reduced and, therefore, their effects on the radar system can be mitigated, by field scattering. Field scattering can also be accomplished according to the exemplary embodiments by forming a texture on one or more of the surfaces of the shield component in the radar module. FIGS. 10A and 10B include schematic top views of EMI shield components 306g and 306h of an automotive radar module, illustrating texture patterns 318g and 318h, respectively, for mitigation of multipath effects, according to exemplary embodiments. As illustrated in FIGS. 10A and 10B, textures 318 can include a pattern of reflective elements protruding from one or more surfaces of shield 306. In the exemplary embodiments of FIGS. 10A and 10B, the protruding elements are pyramid-shaped and cone-shaped, respectively. However, it will be understood that other shapes can be used according to the exemplary embodiments. For example, the shapes of the elements can be pyramid-shaped, cone-shaped, triangular, circular, rectangular, hexagonal, or any other shape that would provide the desired scattering effect. According to the exemplary embodiments, by applying such a texture to one or more of the angled surfaces of the shield, multipath signals are scattered away from the one or a few specific angles at which they occur and, therefore, reduce the signal pattern distortion and the phase curve ripples. As noted above, FIGS. 10A and 10B illustrate exemplary geometries with pyramid and circular cone-shaped textures on the reflective multipath surfaces. The dimension of the pyramid, cone or other shape is selected according to the exemplary embodiments to maximize the scattering effect for the multipath signal at the operating frequency band.

It is noted from FIGS. 10A and 10B that textures 318g and 318h are illustrated and described in detail as including multiple elements protruding out from one or more surfaces of shields 306g and 306h, respectively. It should be noted that, in addition to or alternatively, shaped indentations which protrude into one or more surfaces of shields 306g and 306h can also be used to scatter multipath signals, according to some exemplary embodiments. In these alternative or additional embodiments, the indentations can be pyramid-shaped, cone-shaped, triangular, circular, rectangular, hexagonal, or any other shape that would provide the desired scattering effect.

According to exemplary embodiments, textures can be formed on one or more shield surfaces near the opening at the receive radar aperture and/or on one or more shield surfaces near the opening at the transmit radar aperture. For example, FIGS. 11A and 11B include schematic top views of EMI shield components of an automotive radar module, illustrating various texture patterns for mitigation of multipath effects, according to exemplary embodiments. Specifically, FIG. 11A illustrates a shield 306i in which a texture pattern 318i is formed only at the receive-side aperture, and FIG. 11B illustrates a shield 306j in which texture patterns 318j are formed at both the receive-side aperture and the transmit-side aperture.

Figure 11A:
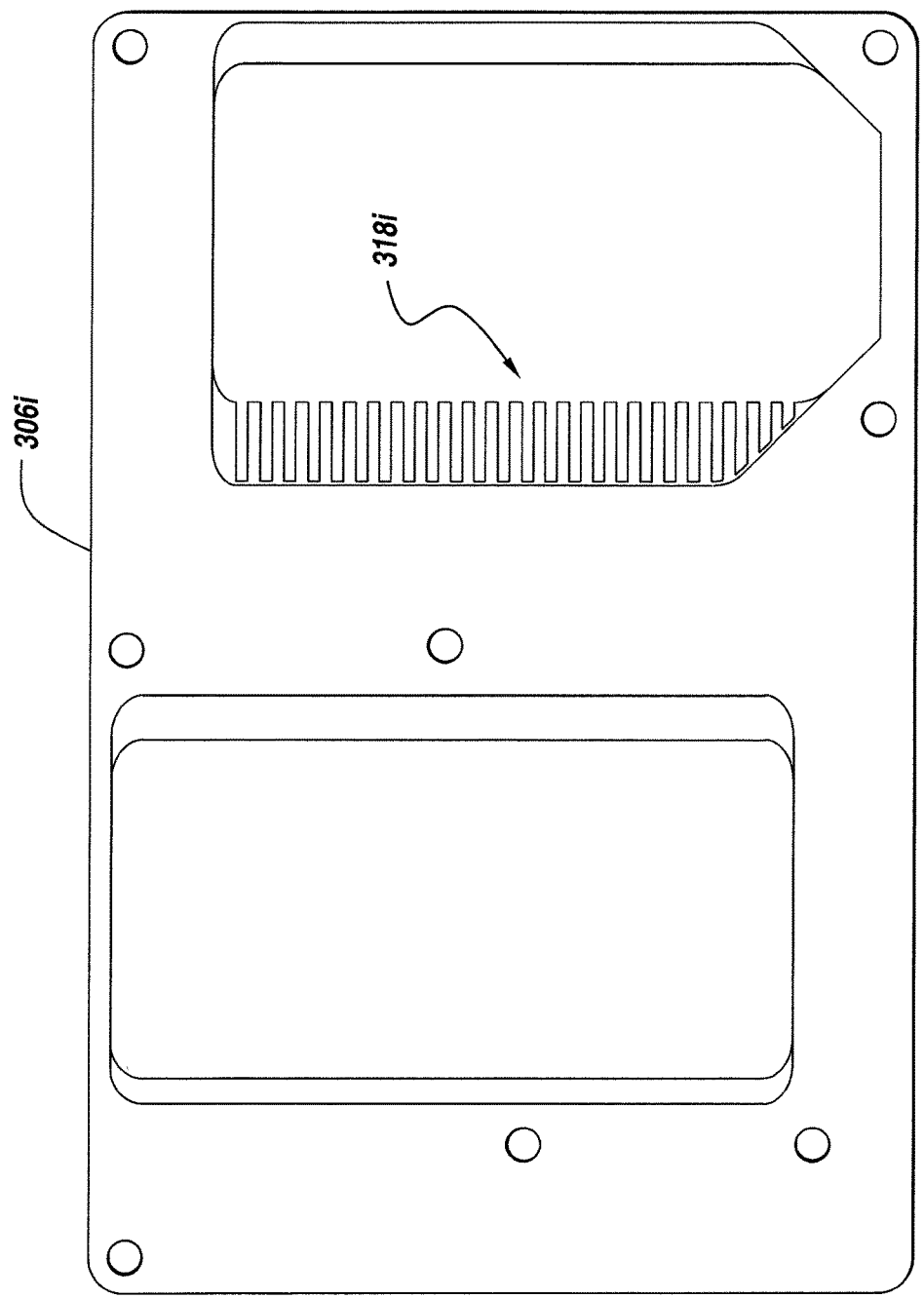
Figure 12:
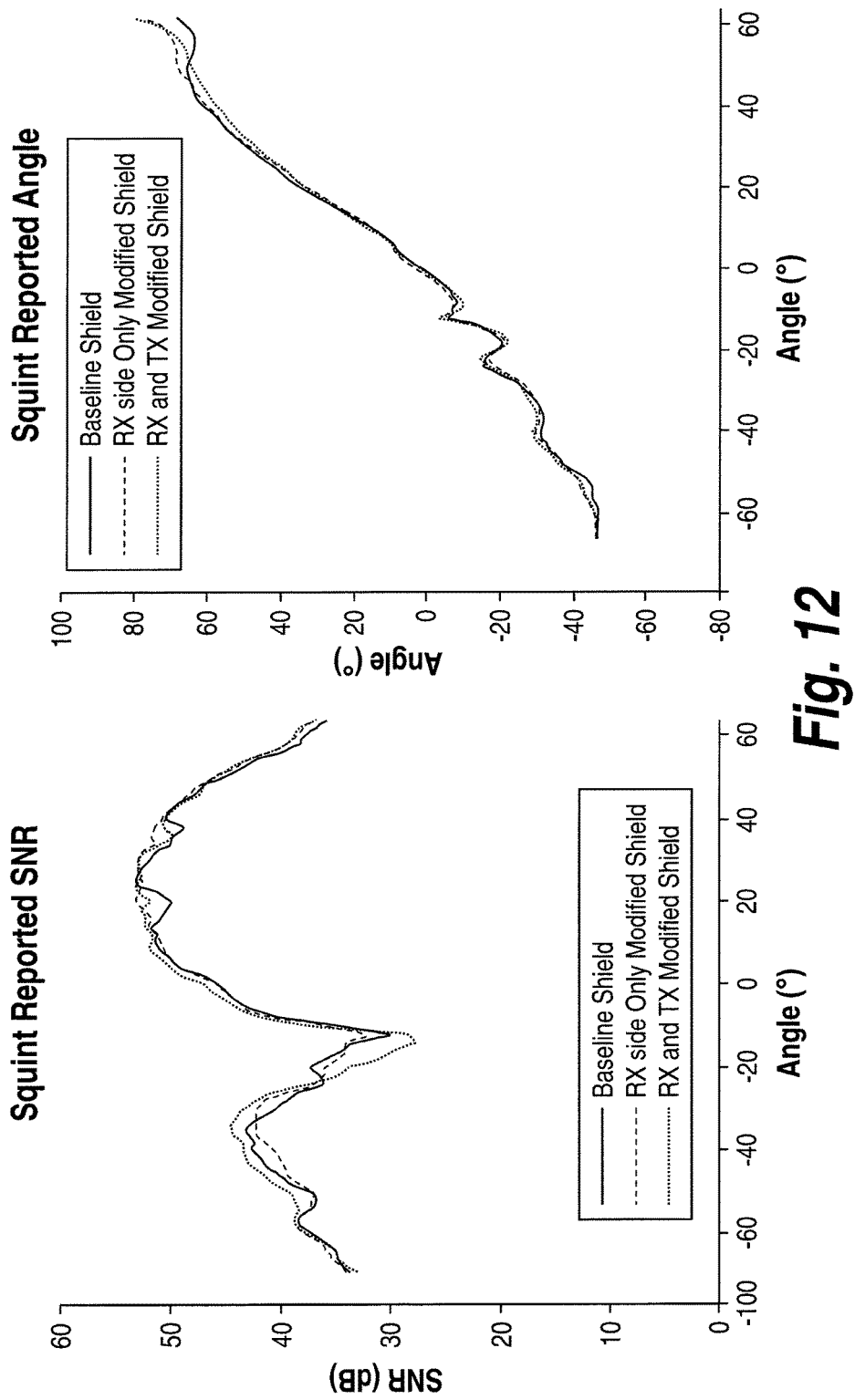
FIG. 12 includes two graphs illustrating squint reported signal-to-noise ratio (SNR) and squint reported angle for a baseline shield component and two textured shields according to exemplary embodiments.

FIG. 12 includes two graphs illustrating squint reported signal-to-noise ratio (SNR) and squint reported angle for a baseline shield component and two textured shields according to exemplary embodiments illustrated in FIGS. 11A and 11B. Referring to FIGS. 11A, 11B and 12, examples of shield 306i and shield 306j with reflection surface textures implemented and the measurement results comparison between baseline (no texture) and the exemplary textured shields 306i and 306j are illustrated. The graphs of FIG. 12 are for a 24-GHz band radar sensor module with reflection surface textures 318i and 318j implemented as illustrated in FIGS. 11A and 11B, respectively. In this exemplary illustration, textures 318i and 318j are comb pin-shape structures on the angled surfaces of shields 306i and 306j to reduce the reflected multipath signals propagating through the effective radar apertures.

As illustrated in the curves of FIG. 12, for this exemplary configuration, the baseline two-way sensor pattern exhibits substantial ripple, while the curve for receive-side only texture (shield 306i in FIG. 11A) is improved to a certain degree. Furthermore, the curve for both transmit-side texture and receive-side texture (shield 306j in FIG. 11B) in exhibits the smoothest pattern curve in the azimuth angle range of +/−60 degrees. Comparing the phase curves for all three cases, it is noted that in the azimuth angle range between 40 and 60 degrees, the baseline data show very clear non-monotonic characteristics, which will result in undesirable target detection ambiguity. Again, the phase curve for shield 306i with receive-side-only texture 318i shows improvement in the phase curve monotonicity, while the phase curve for shield 306j with both receive-side texture and transmit-side texture is the most monotonic in the azimuth angle range between 40 and 60 degrees.

Figure 13A:
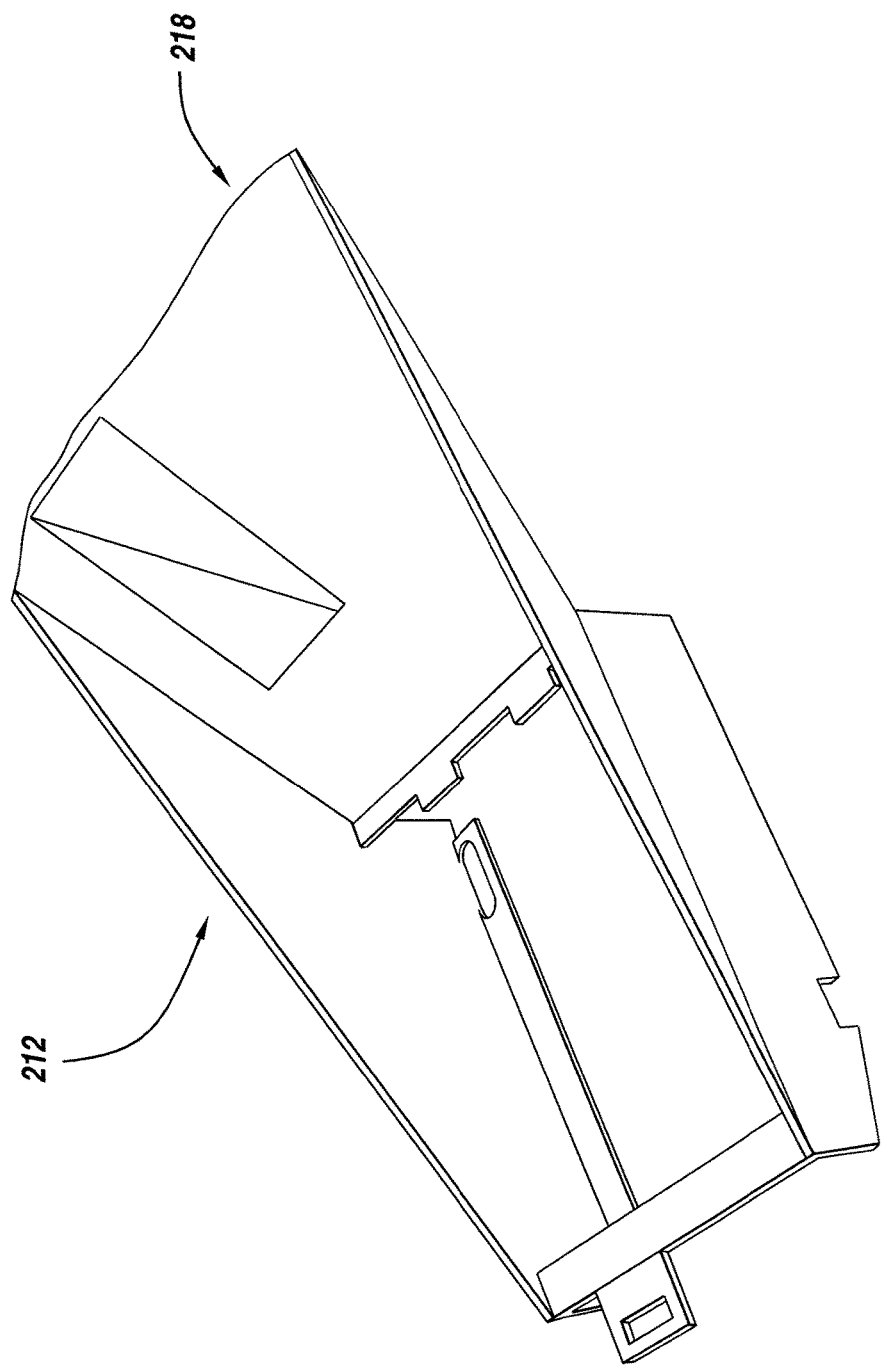
FIG. 13A includes a schematic perspective view of a radar module mounting fixture or bracket for mounting an automotive radar module in an automobile.
Figure 13B:
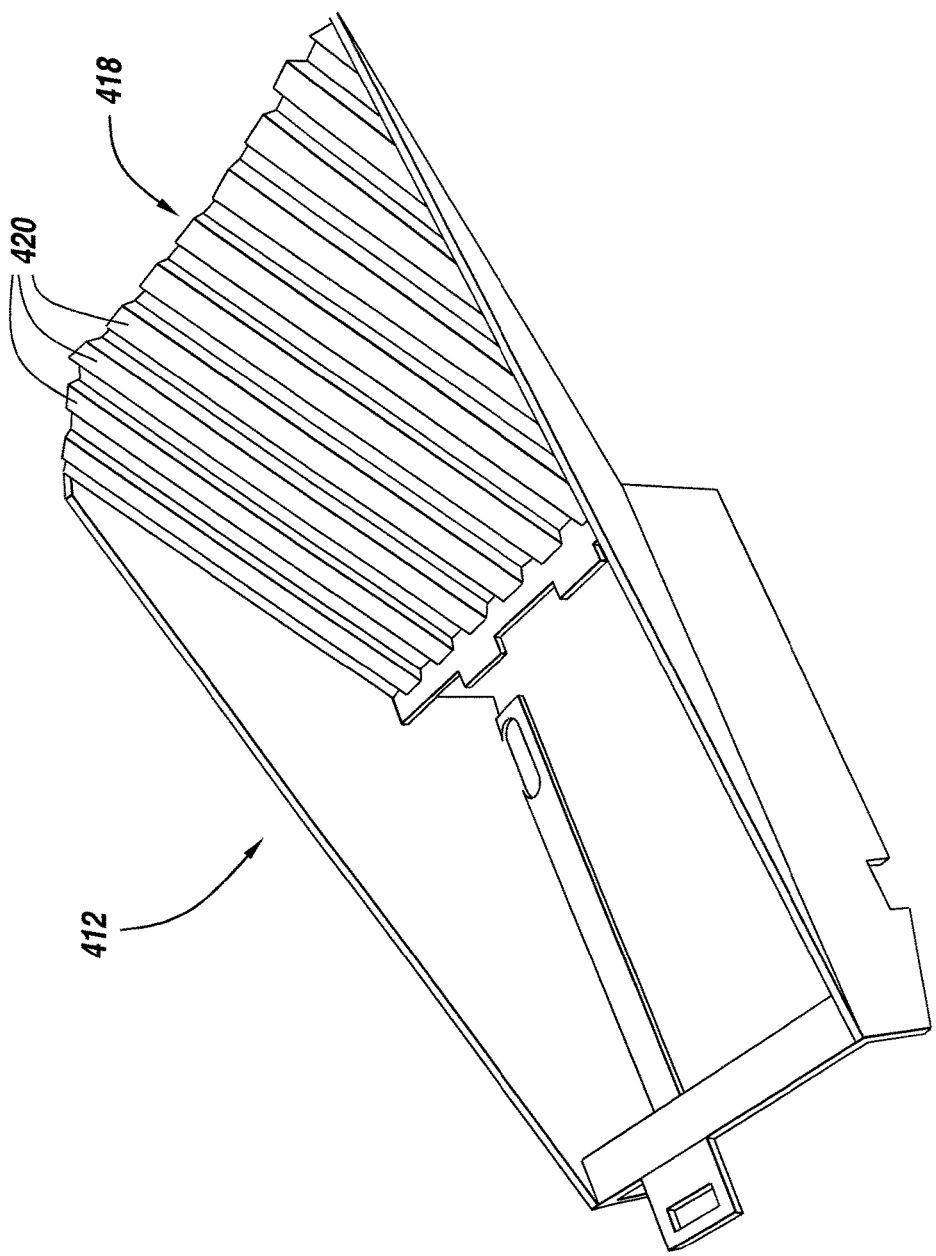
FIG. 13B includes a schematic perspective view of a radar module mounting fixture or bracket for mounting an automotive radar module in an automobile, including a texture pattern for mitigating multipath effects, according to exemplary embodiments.

FIG. 13A includes a schematic perspective view of radar module mounting fixture or bracket 212 for mounting an automotive radar module in an automobile. FIG. 13B includes a schematic perspective view of radar module mounting fixture or bracket 412 for mounting an automotive radar module in an automobile, including a texture pattern for mitigating multipath effects, according to exemplary embodiments. Referring to FIGS. 13A and 13B, mounting fixture or bracket 212 is modified to form mounting fixture or bracket 412 by adding lossy plastic strips 420 onto angled reflection surface or flange 418 of fixture or bracket 412. The result is an attenuation grid structure disposed substantially perpendicular to the radar signal polarization.

Figure 14:
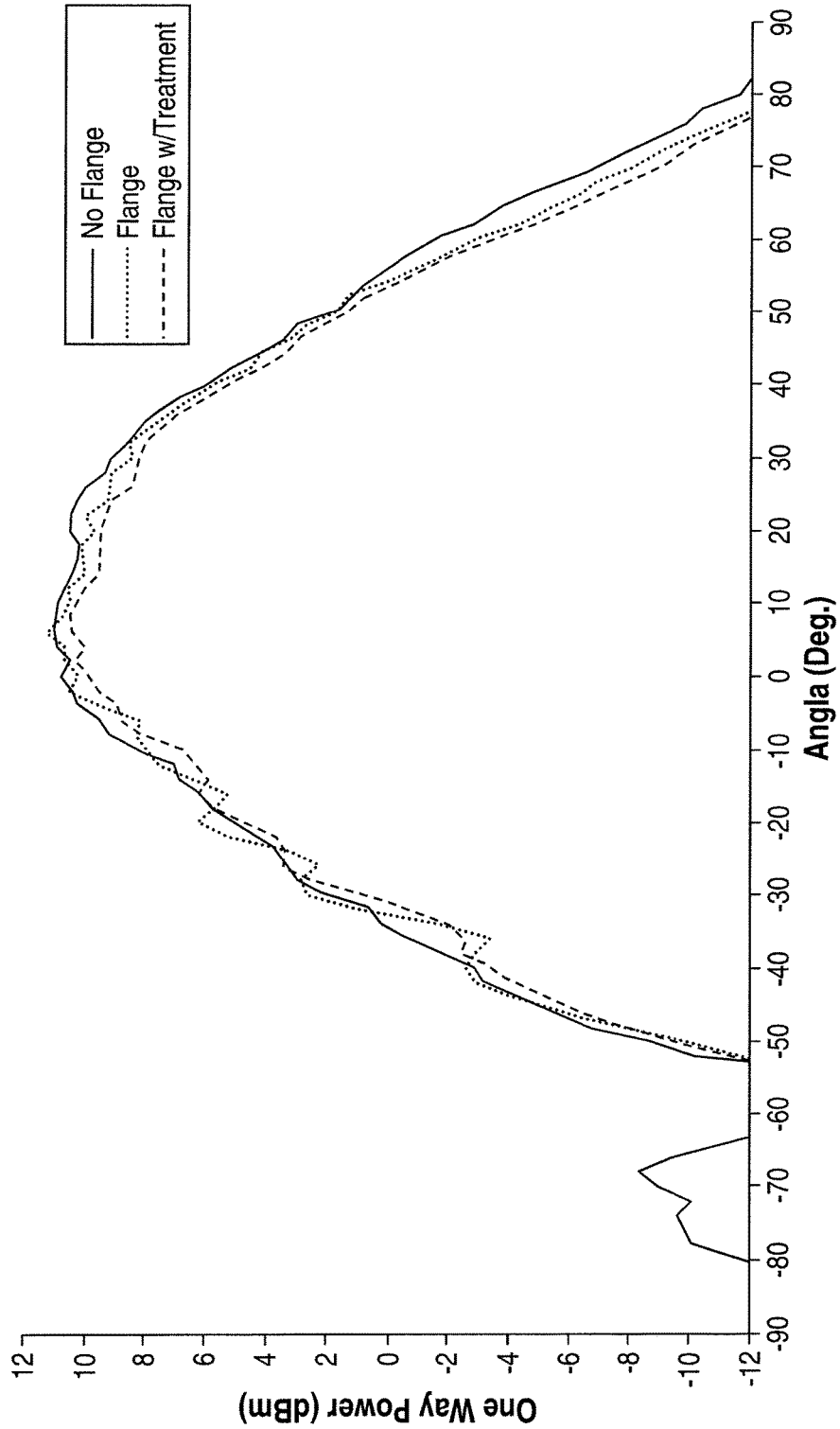
FIG. 14 includes a graph illustrating one-way transmit antenna patterns for an automotive radar module without a mounting fixture or bracket, with a mounting fixture or bracket and with a mounting fixture or bracket have the texture of the exemplary embodiments.

One-way transmit patterns were measured for the baseline without flange 418, for mounting fixture or bracket 212 with flange 218 and for mounting fixture or bracket 412 with flange 418 treated with lossy strips 418. FIG. 14 includes a graph illustrating one-way transmit antenna patterns for an automotive radar module without a mounting fixture or bracket, with mounting fixture or bracket 212 and with mounting fixture or bracket 412 having texture 420 of exemplary embodiments. As noted in the curves of FIG. 14, with the radar sensor only and no flange, the transmit pattern was relatively smooth. However, with the flange 218 included on fixture or bracket 212, i.e., with the large, tilted reflective multipath surface 218, substantial ripple was introduced. By adding the lossy plastic strip structure 420 on flange 418, ripple in the one-way transmit pattern was substantially reduced.

Figure 15:
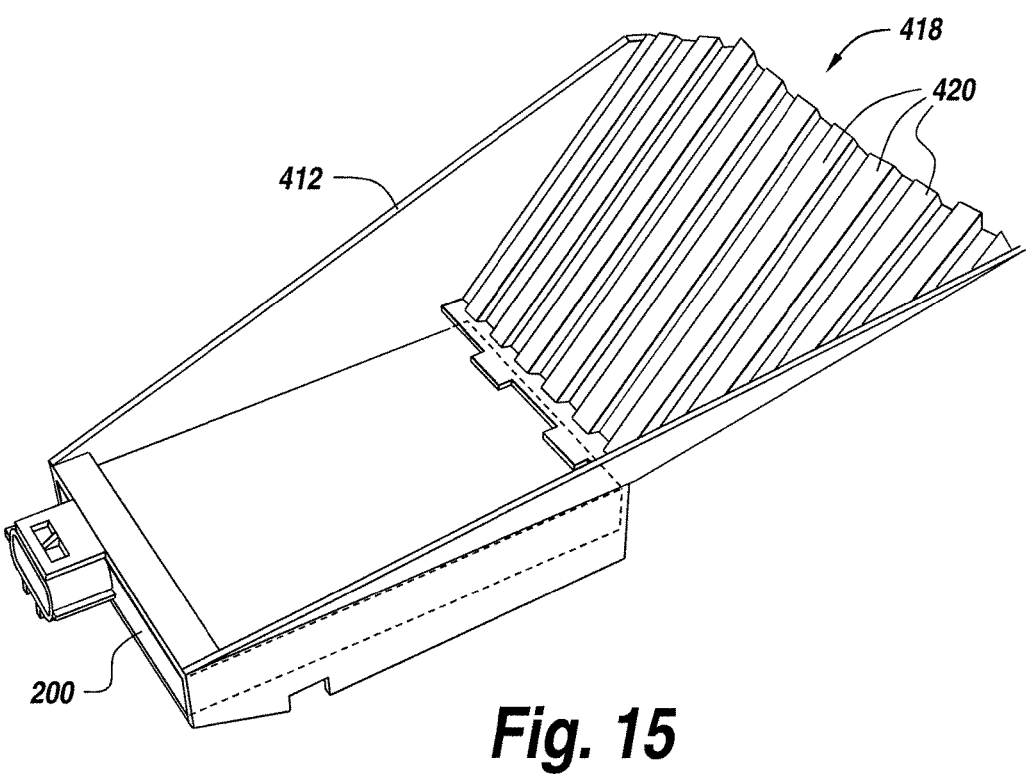
FIG. 15 includes a schematic perspective view of an automotive radar module mounted in a mounting fixture or bracket, according to exemplary embodiments.

FIG. 15 includes a schematic perspective view of an automotive radar module mounted in a mounting fixture or bracket, according to exemplary embodiments. Specifically, referring to FIG. 15, mounting fixture or bracket 412 includes reflective flange 418, which includes lossy plastic strips 420 for mitigating multipath effects. Radar module 200 is mounted within mounting fixture or bracket 412 as shown.

Figure 16:
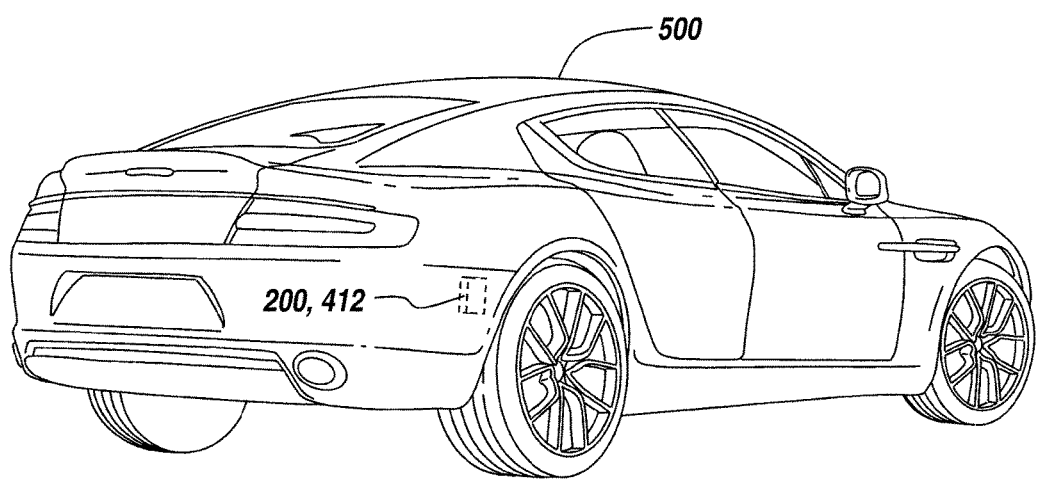
FIG. 16 includes a schematic perspective view of an automobile equipped with an automotive radar module, according to exemplary embodiments.

FIG. 16 includes a schematic perspective view of an automobile equipped with an automotive radar module, according to exemplary embodiments. Specifically, FIG. 15 illustrates radar module 200 mounted within automobile 500 via mounting fixture or bracket 412.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A radar system with reduced multipath effects, comprising:
    a component of a radar sensor module on which at least one antenna element is formed, the at least one antenna element having a surface at which radar radiation is received or transmitted, the at least one antenna element having a radiation aperture;
    an electromagnetic interference (EMI) shield in proximity to the antenna element such that a portion of the radar radiation impinges on a first portion of the EMI shield and passes through an opening formed in a second portion of the EMI shield, the opening comprising an angled wall surface forming an obtuse angle with respect to the surface of the antenna element, such that the angled wall surface slopes upwardly and angularly away from the surface of the antenna element; wherein the angled wall surface of the opening comprises a texture such that when the portion of the radiation impinges on the angled wall surface, the amount of multipath signal propagating through the radiation aperture of the antenna element is reduced; and
    a radome disposed over the EMI shield such that the EMI shield is between the component on which the at least one antenna element is formed and the radome, the radome comprising a protruding element which protrudes into the opening in the second portion of the EMI shield, such that the protruding element of the radome and the angled wall surface of the opening in the EMI shield are shaped and positioned such that they are aligned to be part of a sealed cavity for EMI shielding of the at least one antenna element.

2. The radar system of claim 1, wherein the radar sensor module is an automotive radar sensor module.

3. The radar system of claim 1, wherein the texture comprises a plurality of protrusions protruding out of the angled wall surface of the opening in the EMI shield.

4. The radar system of claim 3, wherein the protrusions are at least one of strip-shaped, pyramid-shaped, grid-shaped, slot-shaped, conical, triangular, rectangular, circular and spherical.

5. The radar system of claim 1, wherein the texture comprises a plurality of indentations protruding into the angled wall surface of the opening in the EMI shield.

6. The radar system of claim 5, wherein the indentations are at least one of strip-shaped, pyramid-shaped, grid-shaped, slot-shaped, conical, triangular, rectangular, circular and spherical.

7. The radar system of claim 1, wherein the texture comprises a material that at least partially reflects the radar radiation.

8. The radar system of claim 1, wherein the texture comprises a material that at least partially absorbs the radar radiation.

9. The radar system of claim 1, wherein the EMI shield comprises a material that at least partially reflects the radar radiation.

10. The radar system of claim 1, wherein the EMI shield comprises a material that at least partially absorbs the radar radiation.

11. The radar system of claim 1, wherein the component of the radar sensor module on which the at least one antenna element is formed is a printed circuit board.

12. The radar system of claim 1, wherein the at least one antenna element is a transmit antenna element.

13. The radar system of claim 1, wherein the at least one antenna element is a receive antenna element.

14. The radar system of claim 1, wherein the at least one antenna element comprises a plurality of antenna elements.

15. The radar system of claim 14, wherein at least one of the plurality of antenna elements is a transmit antenna element, and at least one other of the plurality of antenna elements is a receive antenna element.

16. A method of making a radar system with reduced multipath effects, comprising:
    forming at least one antenna element on a component of a radar sensor module, the at least one antenna element having a surface at which radar radiation is received or transmitted, the at least one antenna element having a radiation aperture;
    locating an electromagnetic interference (EMI) shield in proximity to the antenna element such that a portion of the radar radiation impinges on a first portion of the EMI shield and passes through an opening formed in a second portion of the EMI shield, the opening comprising an angled wall surface forming an obtuse angle with respect to the surface of the antenna element, such that the angled wall surface slopes upwardly and angularly away from the surface of the antenna element; and
    forming a texture on the angled wall surface of the opening such that when the portion of the radiation impinges on the angled wall surface, the amount of multipath signal propagating through the radiation aperture of the antenna element is reduced; and
    locating a radome over the EMI shield such that the EMI shield is between the component on which the at least one antenna element is formed and the radome, the radome comprising a protruding element which protrudes into the opening in the second portion of the EMI shield, such that the protruding element of the radome and the angled wall surface of the opening in the EMI shield are shaped and positioned such that they are aligned to be part of a sealed cavity for EMI shielding of the at least one antenna element.

17. The method of claim 16, wherein the radar sensor module is an automotive radar sensor module.

18. The method of claim 16, wherein the texture is formed with a plurality of protrusions protruding out of the angled wall surface of the opening in the EMI shield.

19. The method of claim 18, wherein the protrusions are at least one of strip-shaped, pyramid-shaped, grid-shaped, slot-shaped, conical, triangular, rectangular, circular and spherical.

20. The method of claim 16, wherein the texture is formed with a plurality of indentations protruding into the angled wall surface of the opening in the EMI shield.

21. The method of claim 20, wherein the indentations are at least one of strip-shaped, pyramid-shaped, grid-shaped, slot-shaped, conical, triangular, rectangular, circular and spherical.

22. The method of claim 16, wherein the texture comprises a material that at least partially reflects the radar radiation.

23. The method of claim 16, wherein the texture comprises a material that at least partially absorbs the radar radiation.

24. The method of claim 16, wherein the EMI shield comprises a material that at least partially reflects the radar radiation.

25. The method of claim 16, wherein the EMI shield comprises a material that at least partially absorbs the radar radiation.

26. The radar system of claim 16, wherein the antenna element is formed on a printed circuit board.

* * * * *